United States Patent [19]

Komuro et al.

[11] Patent Number: 4,926,332
[45] Date of Patent: May 15, 1990

[54] LOCKING DEVICE FOR VEHICLES

[75] Inventors: Kenichi Komuro, Toyota; Taneichi Kawai, Anjo; Atsushi Kamei, Nagoya; Toru Asada, Takaoka; Nozomu Torii, Hekinan; Ryoichi Fukumoto, Nagoya, all of Japan

[73] Assignee: Aisin Seiki Kabushiki Kaisha, Japan

[21] Appl. No.: 271,670

[22] Filed: Nov. 15, 1988

Related U.S. Application Data

[63] Continuation of Ser. No. 888,168, Jul. 22, 1986, abandoned.

[30] Foreign Application Priority Data

Jul. 22, 1985 [JP] Japan ................. 60-161367
Jul. 23, 1985 [JP] Japan ................. 60-162349

[51] Int. Cl.$^5$ .................. G08C 19/00; G06F 7/04
[52] U.S. Cl. .................. 364/424.05; 340/825.69; 340/825.31; 340/825.54; 307/10.5; 70/257
[58] Field of Search ............ 364/424.05; 340/542, 340/543, 63, 64, 825.31, 825.32, 825.54, 825.69; 361/171, 172; 180/287; 70/257, 277; 307/10 AT; 235/382

[56] References Cited

U.S. PATENT DOCUMENTS

| | | | |
|---|---|---|---|
| 4,453,161 | 6/1984 | Lemelson | 340/825.31 |
| 4,670,746 | 6/1987 | Taniguchi et al. | 340/825.31 |
| 4,672,375 | 6/1987 | Mochida et al. | 340/825.69 |
| 4,673,914 | 6/1987 | Lee | 340/64 |
| 4,688,036 | 8/1987 | Hirano et al. | 70/257 |

FOREIGN PATENT DOCUMENTS

| | | |
|---|---|---|
| 2647917 | 10/1976 | Denmark . |
| 3244855 | 3/1982 | Denmark . |
| 3347024 | 12/1983 | Denmark . |
| 0138090 | 9/1984 | European Pat. Off. . |
| 2824421 | 3/1978 | Fed. Rep. of Germany . |
| 2920709 | 5/1979 | Fed. Rep. of Germany . |
| 3244049 | 11/1982 | Fed. Rep. of Germany . |
| 3300732 | 1/1983 | Fed. Rep. of Germany . |
| 3320721 | 6/1983 | Fed. Rep. of Germany . |
| 2108189 | 9/1981 | United Kingdom . |

Primary Examiner—Parshotam S. Lall
Assistant Examiner—Ellis B. Ramirez
Attorney, Agent, or Firm—Finnegan, Henderson, Farabow, Garrett & Dunner

[57] ABSTRACT

A locking device for vehicles includes a card including a microprocessor and a transmitter for generating and transmitting commands for locking and unlocking the doors of a motor vehicle. A lock control device includes a microprocessor and a receiver for receiving the commands transmitted by the lock command device. The lock control device will only carry out a receive command if the command is applied to a specific motor vehicle and the motor vehicle is in the proper state to implement the command. Change data is generated by the lock control device and transmitted to the lock command device to change the value of the next subsequent lock command so that the lock command can be uniquely identified with the motor vehicle.

9 Claims, 16 Drawing Sheets

LOCKING DEVICE FOR VEHICLES

This application is a continuation of application Ser. No. 888,168, filed July 22, 1986, now abandoned.

BACKGROUND OF THE INVENTION

1. Field of the Invention

The present invention relates to a lock control device for vehicles, and more particularly to a lock control device for vehicles which prevents an unauthorized entry into a vehicle and the unauthorized use of the vehicle by a third party.

2. Description of the Prior Art

In a conventional lock control apparatus, a door lock device holds the door closed by engaging a door lock mechanism attached to the door with a striker attached to a vehicle body. When an inside handle or an outside handle is released, a panel of the door lock mechanism is unlatched and the door is opened by disengaging the door lock mechanism and the striker. The door lock mechanism has a lock function for preventing the opening of the panel when the inside handle or the outside handle is released. A key cylinder attached to the door and a lock knob attached within the vehicle are connected to the door lock mechanism through a link and the door lock mechanism is locked or unlocked according to the operation thereof.

In this conventional lock control apparatus, however, the key cylinder is connected to the door lock mechanism through the link, so that when the link is actuated the door lock mechanism is unlocked and the door can be opened by the operation of the outside handle. Further, in an engine ignition circuit, an outer portion of an engine key switch may be shorted by an electric lead line and the engine can be easily started.

There has been a proposal for a door lock in which an unlock code and a lock code are sent by a transmitter and received by the lock mechanism. The door lock is a coincidence type lock that unlocks the door lock mechanism only when the unlock code is received. An example of such an mechanism may be found in Japanese application publication nos. 57(1982)-7737 and 59(1984)-24075). In that lock control apparatus, when a car owner sends an electrical signal from outside the vehicle and the door is unlocked, it is possible for a third party to receive the unlock code, analyze the unlock code, and make a transmitter for sending a similar unlock code. The transmitter is in effect similar to a duplicate key. When the car owner is absent, the bogus transmitter may be used to break into the car.

Further, a conventional lock knob is provided on each door within the vehicle to indicate whether the vehicle is locked or unlocked and to enable the door to be locked or unlocked from within the vehicle. The lock knob can be manually operated after breaking the window so that the lock system is not secure.

OBJECTS AND SUMMARY OF THE INVENTION

An object of the present invention is an improved locking device for vehicles which prevents unauthorized entry into a locked vehicle and diminishes the chance of a vehicle from being stolen.

Another object of the present invention is a locking device for vehicles that employs a card transmitter for controlling the locking and unlocking of the vehicle.

A further object of the present invention is a locking device for vehicles that controls the locking of the doors and luggage compartment thereof.

These and other objects are attained by a lock control device for a vehicle comprising a lock device adapted to be mounted on the vehicle, a lock driver for energizing the lock device to lock and unlock the lock device, energization indicating switch means for indicating the energization of the lock driver, lock instruction means for selectively generating a lock command or an unlock command, lock control means responsive to the commands generated by the lock instruction means for establishing a lock enable state in response to the lock command and an unlock enable state in response to the unlock command, and a lock actuator control for controlling the lock driver to unlock the lock device in response to the unlock enable state and the energization indication by the energization indicating switch means and for controlling the lock driver to prevent the energization of the lock device to unlock the lock device in response to the lock enable state.

A second aspect of the present invention is attained by a lock control device for a vehicle comprising lock instruction means for selectively generating a lock command or an unlock command, lock control means for storing a lock reference code and an unlock reference code and for establishing a lock state in response to the lock command being equal to the lock reference code and an unlock state in response to the unlock command being equal to the unlock reference code, a lock setting apparatus adapted to control the locking and unlocking of a lock apparatus in response to the lock state and the unlock state, respectively, and code change generating means for generating change data in response to the unlock command being equal to the unlock reference code.

BRIEF DESCRIPTION OF THE DRAWINGS

The manner by which the above objects and other objects, features, and advantages of the present invention are attained will become fully apparent from the following detailed description when it is considered in view of the accompanying drawings wherein:

FIG. 2 is a side view showing a reader for the card CAD used with the control system of FIG. 1a;

FIG. 3b is a plane view showing the bottom surface of the card CAD of FIG. 3a;

FIG. 3c is a block diagram showing the schematic construction of circuitry on th card CAD of FIG. 3a;

FIG. 5a is a flow diagram showing the entry control operations of a microprocessor 32 of FIG. 1a;

FIG. 8b is a block diagram showing the schematic construction of circuitry on the card CAD of FIG. 8a;

DETAILED DESCRIPTION OF THE PREFERRED EMBODIMENTS

Figure 1A:
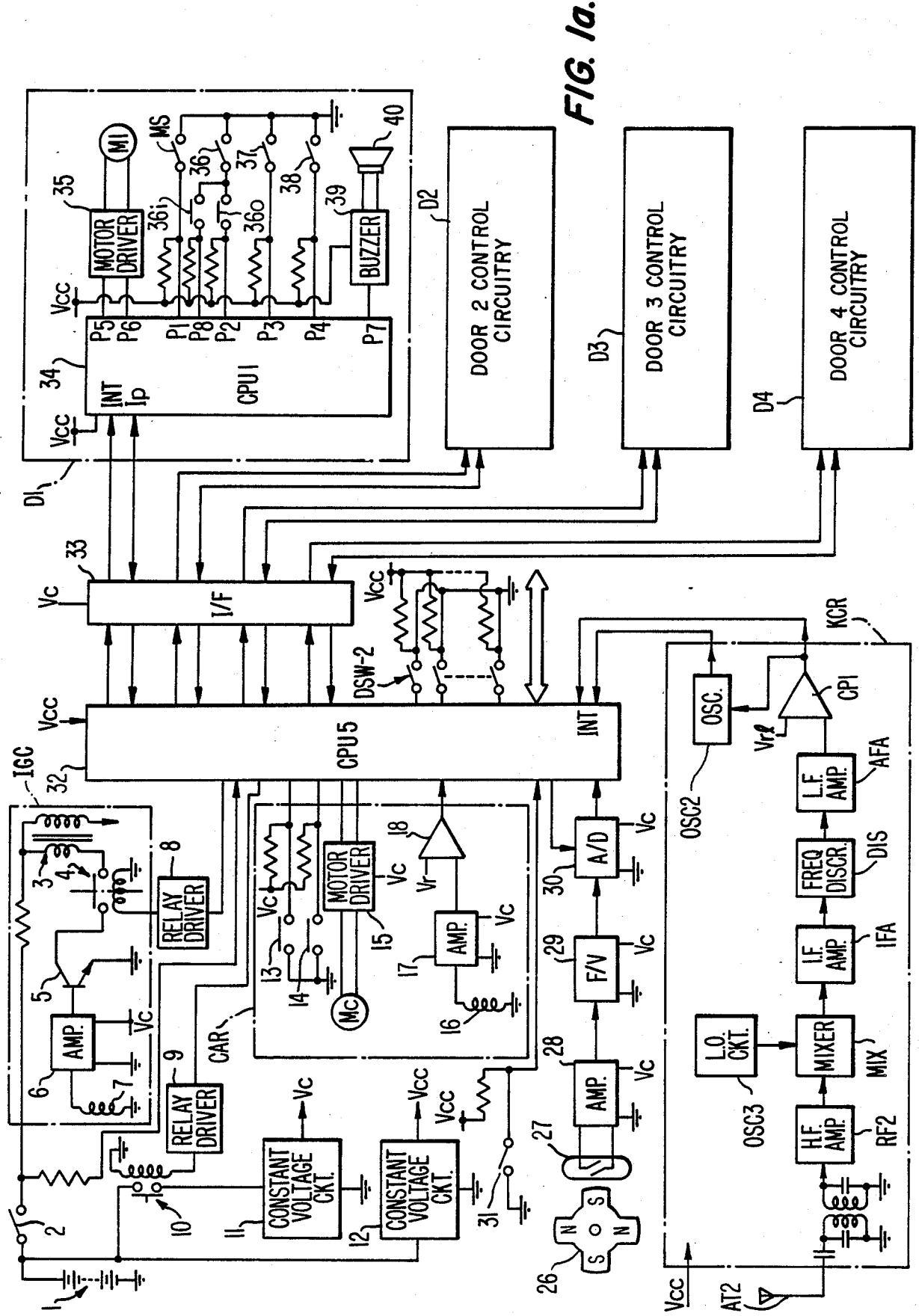
FIG. 1a is a block diagram showing a control system for the locking device of the present invention.

Referring now to FIG. 1a, an ignition circuit IGC is connected to a battery of a vehicle via an engine key switch 2 adapted for insertion into an engine key cylinder. The ignition circuit IGC is normally provided with an ignition coil 3, a pick-up coil 7 for obtaining a signal synchronized with the actuation of an engine piston, an amplifier 6 for amplifying and shaping the waveform of the voltage generated by the coil 7, and a switching transistor 5 for energizing the primary coil of the ignition coil 3 in synchronization with the generated voltage. A relay contact is inserted into the primary coil of the ignition circuit IGC and a relay 4 is assembled therein. When the relay 4 is not energized, the relay contact is open so that the ignition coil 3 is not energized. The engine may not be started in this condition.

A constant voltage circuit 11 is connected to the battery for supplying via a relay 10 the voltage $V_c$ to the electrical components having comparatively large consumption of electric power such as a motor, a buzzer, etc. A constant voltage circuit 12 is also connected to the battery 1 and provides power $V_{cc}$ to a microprocessor 32, etc. and supplies power to the electric devices having small consumption of electrical power when the engine key switch 2 is opened.

A relay driver 8 is provided for closing the relay 4 and receives an output of the constant voltage circuit 11 and a relay driver 9 is provided for closing the relay 10 and receives an output of the constant voltage circuit 12. Terminals of the control input of the relay drivers 8, 9 are connected to an outlet port of the microprocessor 32.

A card reader CAR, an A/D converter 30, a key code receiver KCR, an interface 33, a DIP switch DSW-2 for setting a code, and other devices and circuits (not shown) are connected to the microprocessor 32. A microprocessor 34 associated with the driver-side door D1, as well as other microprocessors D2, D3, and D4 associated with a passenger-side door, rear driver-side door, and rear passenger-side door, respectively, are connected to the interface 33. That is to say, a separate microprocessor is adapted to each door of the vehicle and is connected to the microprocessor 32 via the interface 33.

When a permanent magnet gear 26 connected to a vehicle speed meter cable (not shown) is rotated, a reed switch 27 is opened and closed and an amplifier generates electrical pulses with a frequency determined by the opening and closing of the reed switch 27. The electrical pulses are converted by a F/V convertor 29 to an analog voltage that is proportional to the pulse frequency. The analog voltage is changed to a digital signal by an A/D converter 30 and is supplied to the microprocessor 32. The digital signal indicates a vehicle speed V.

The key code receiver KCR is connected to an antenna AT2 and remodulates the code data of the received signal and supplies it to the microprocessor 32. When the electrical signal received is not of a certain frequency, the output of a comparator CP1 is H. When the electrical signal of a certain frequency is received and the code data is remodulated, the output of a comparator CP1 becomes L.

The microprocessor 32 is interrupted upon receiving the L output and reads the code data. As described later, when the vehicle is parked and the door is locked, the door lock is unlocked by sending the code data from the outside. Accordingly, the key code receiver KCR and the microprocessor 32 must always wait until a signal with a certain frequency is received, even when the engine key switch 2 is opened. The constant voltage $V_{cc}$ is supplied to the key code receiver KCR, the microprocessor 32, and the constant voltage circuit 12.

Figure 2:
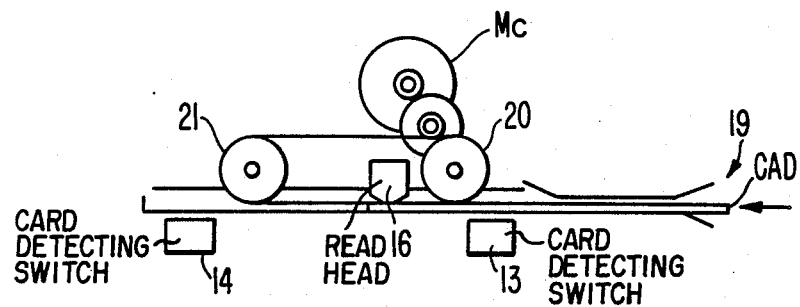

The card reader CAR is described in FIG. 2 and is adapted for mounting in the inside of an inner panel in front of the driver seat. A slot 19 for inserting a card CAD is provided near the driver's seat. The card CAD for code input is inserted into the slot 19. A card detecting switch 13 is arranged in the inside of the slot 19. Rollers 20, 21 are provided for positioning the card CAD and a magnetic reading head 16 reads the code on the card CAD. A motor Mc drives the rollers 20, 21 via a reduction machine, and a switch 14 detects the presence of the card CAD.

Switches 13, 14 are connected to the microprocessor 32 and a motor drive 15 drives the motor Mc under the control of the microprocessor 32. The magnetic reading head 16 is connected to an amplifier 17 (FIG. 1a). The amplifier 17 supplies to a comparator 18 a signal indicating the signal level read by the head 16. The output of the comparator 18 is a binary code, namely, L or H, and is supplied to the microprocessor 32.

When the card CAD is inserted in the slot 19 and is detected by the switch 13, the motor Mc is energized and the rollers 20, 21 are rotated in the clockwise direction. The card CAD is pulled into the slot 19 and at this time the information magnetically recorded on the card CAD is read. When the leading edge of the card CAD is detected by the switch 14, the motor Mc is stopped and the card CAD is stopped in the slot 19. As described later, when the engine key switch 2 is opened, i.e., the engine is stopped, the motor Mc is energized in the reverse direction and the card CAD is driven outwardly from the slot 19. When the switch 13 no longer detects the presence of the card CAD, the motor Mc is stopped.

Figure 3A:
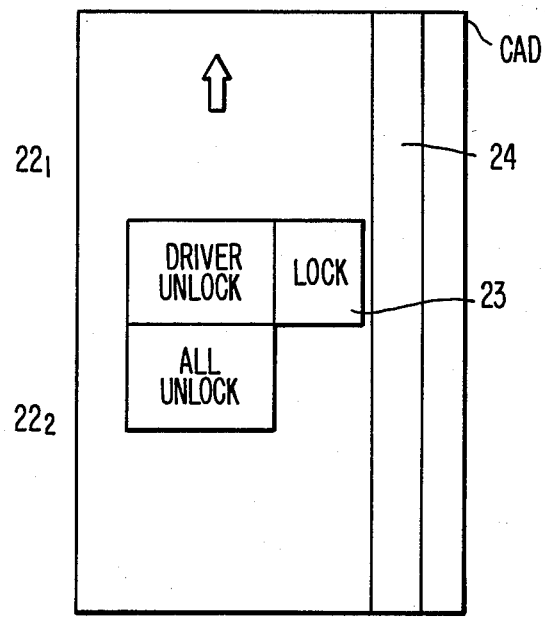
FIG. 3a is a plane view showing the top surface of a card CAD for providing code data.
Figure 3B:
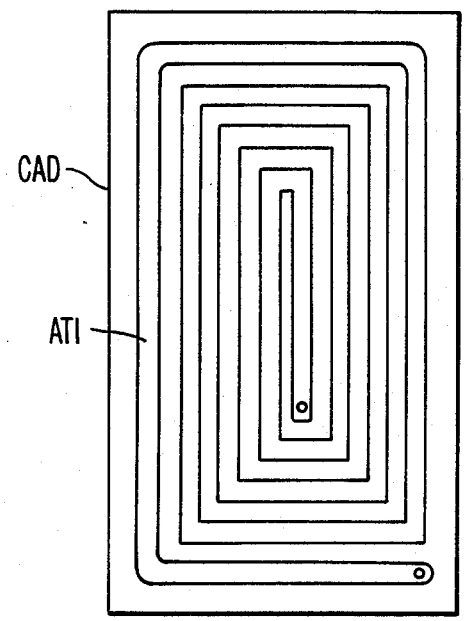
Figure 3C:
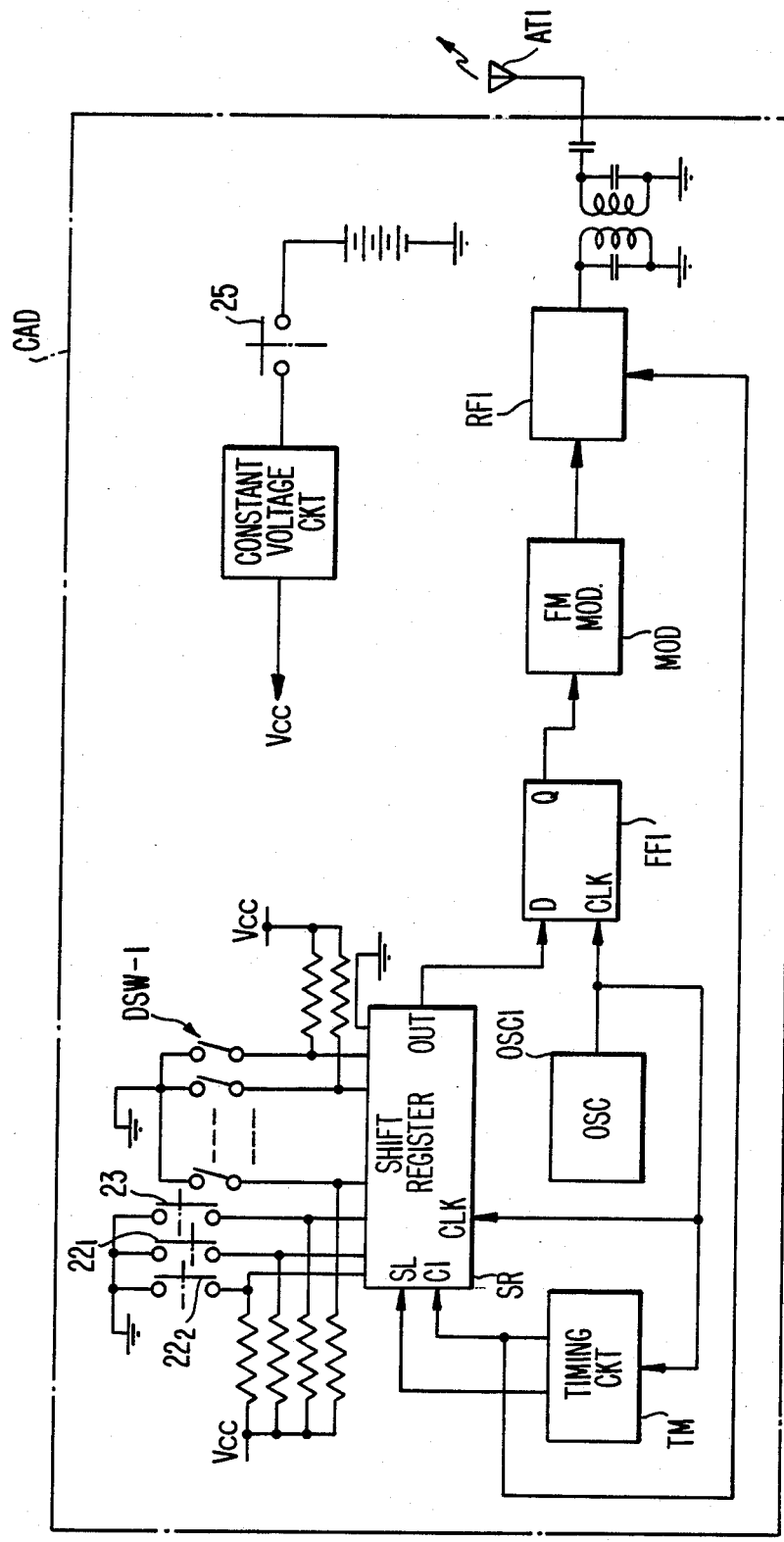

The front surface of the card CAD is shown in FIG. 3a the rear surface thereof is shown in FIG. 3b, and a circuit formed in the card CAD is shown in FIG. 3c. A ferro-magnetic film 24 is formed on the front surface of the card CAD and its front surface is covered by a protective film. Operating surfaces of unlock switches $22_1$, $22_2$, and a lock switch 23 are exposed. A source switch 25 (FIG. 3c) is arranged at the lower portion of the switches $22_1$, $22_2$ and is also closed in accordance with the closing of the switch 23. An antenna AT1 constructed by a printed terminal is formed on the rear surface of the card CAD and is protected by the protective film.

When the card CAD is pulled into the slot 19 by the roller 20, the ferro-magnetic film 24 moves under the reading head 16 and the information magnetically recorded thereon is read by the head 16.

A DIP switch DSW-1 is provided in the inside of the card CAD for setting a data code. When the unlock switch $22_1$ or $22_2$ is closed or the lock switch 23 is closed to close the source switch 25, a code data formed by the combination of the open and close states of the lock and unlock switches 23, $22_1$, $22_2$ and the switch DSW-1 is supplied to a flip flop FF1 via a parallel-to-serial shift register SR. The output of the flip flop FF1 is modulated and transmitted by the antenna AT1. The code data is repeatedly sent under the control of a timing circuit TM. An L signal is provided when the head 16 first senses the card CAD. When the key code receiver KCR receives the L signal, the microprocessor 32 is interrupted and reads the data transmitted from the card CAD and represented by a selected number of bits. The final 2 bits read are data indicating the locked or unlocked states and are represented by the states of the switches $22_1$, $22_2$, and 23. The preceding bits of the data code are decided by setting the DIP switch DSW-1.

The number of individual switches within the DIP switch DSW-1 and DSW-2 (FIG. 1a) is the same. When a car is delivered to a user, the settings of the DIP switches DSW-1 and DSW-2 are the same.

Figure 1B:
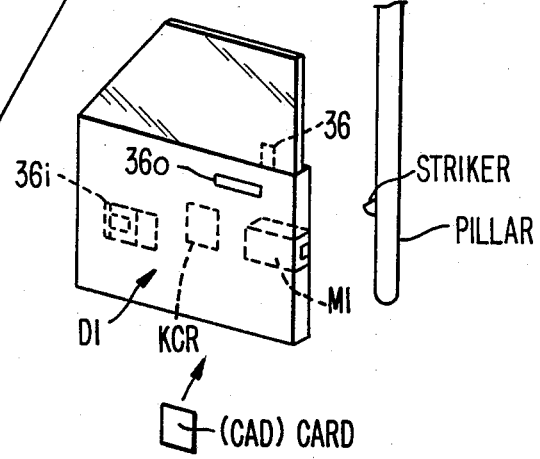
FIG. 1b is a view showing the outside of a driver-side door D1.

Now referring to FIGS. 1a and 1b, the door D1 is provided with a lock knob switch 36 operable from within the vehicle, an inside handle switch 36i, an outside handle switch 36o, a nut bar position detecting switch MS provided in the inside of the door, a half-closed detecting switch 37, a full-close detecting switch 38, a lock/unlock motor M1, a motor driver 35, a buzzer 40, a buzzer driver 39, and the microprocessor 34. The microprocessor 34 is electrically powered by receiving the constant voltage $V_{cc}$ from the constant voltage circuit 12. The other doors D2 to D4 have the same electrical construction.

Figure 4:
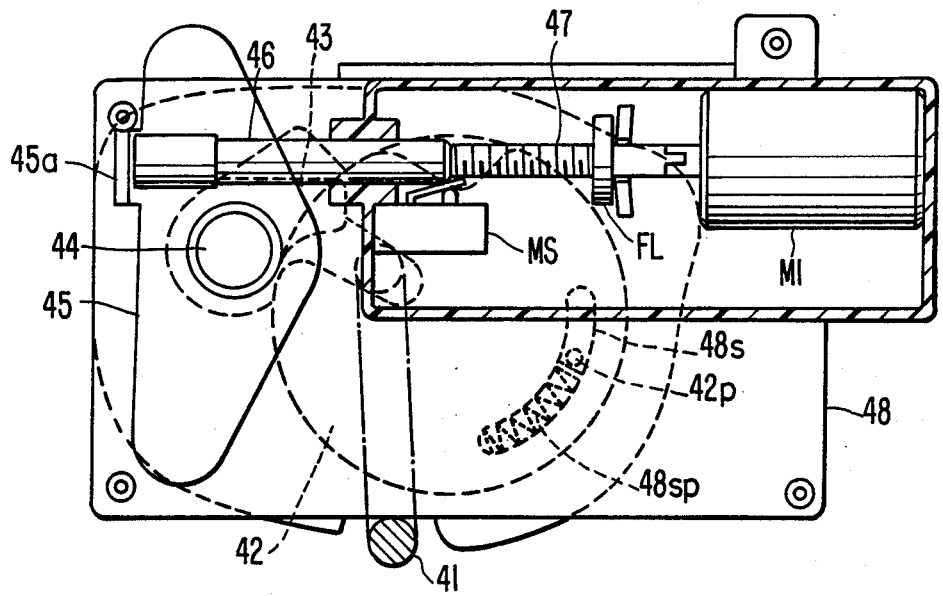
FIG. 4 is a side view of a door lock mechanism adapted for the driver-side door.

Referring to FIG. 4, a door lock apparatus for the door D1 of the driver-side seat is shown. A recess portion of a platelike latch member 42 having a substantially circular shape is engaged with a striker 41 fixed to the vehicle body to hold the door closed. A pin 42p is integrated with the latch member 42, is insertable into a circular groove 48s formed on a base plate 48, and is urged by a spring 48sp. Accordingly, a rotating force in the counterclockwise direction is always provided to the latch member 42.

A panel 43 engaged with the recess portion of the latch member 42 is pivotably supported on a shaft 44 and is urged in the clockwise direction about the shaft 44. When the recess portion of the latch member 42 is engaged with the striker 41 and the panel 43 is engaged with the recess portion (latch position) as shown in FIG. 4, the latch member 42 cannot rotate and the door cannot be opened. The panel 43 is connected to a lock lever 45. When the lock lever 45 is rotated in the counterclockwise direction and the panel 43 is disengaged from the recess portion (unlatch position), the door can be opened. The lock lever 45 is provided with a bent projection 45a to cause the counterclockwise rotation of the lock lever 45 (unlock driver).

A nut bar 46 contacts the projection 45a and has a female screw hole at the center thereof. An outer surface thereof is columnar-shaped at the front end portion and has square pillar shape at the middle and rear end portions. The square, pillar-shaped portion is movably supported at a square-shaped opening of a case of a lock actuator. A screw bar 47 is screwed into the inside of the nut bar 46. A flange FL is formed on an end portion of the screw bar 47 which is engaged with a projection raised from a base plate of the door lock apparatus to limit the rightward movement of the screw bar 47. A rotating shaft of the motor M1 is connected to the screw bar 47.

FIG. 4 shows the state in which the motor M1 is energized and the nut bar 46 is moved to the lock position. In this state, a nut position detecting switch MS is open. The state shown in FIG. 4 is the door closed state. When the motor is energized in the reverse direction in this state (door closed), the screw bar 47 is rotated and the nut bar 46 is leftwardly moved (release operation), and the switch MS becomes closed. The nut bar 46 then presses against the projection 45a. The lock lever 45 is rotated in the counterclockwise direction by the nut bar 46. In the open state, the latch member 42 is rotated and the striker 41 is released from the recess portion of the latch member 42. The other doors D2 to D4 have lock mechanisms of the same construction. In such lock mechanisms, the nut bar 46 is leftwardly moved upon the latch state (FIG. 4) and the door is opened by the release operation.

Again, referring to FIG. 1a, a person-leaving switch 31 indicates whether or not there is a person in the vehicle. When a person is in the vehicle, the switch 31 is closed. When all persons exit from the vehicle, the switch 31 is opened. The state of the switch 31 is read by the microprocessor 32. The microprocessor 32 determines also the open and close state of the key switch 2.

The control operation of the microprocessors 32, 34 are described hereinafter. For better understanding, the actions of the driver and the corresponding actuation of vehicle devices are described. The actuation of vehicle devices is performed by the microprocessors 32, 34, and the microprocessors associated with the doors D2–D4.

(1) The State of the Vacant Parking

The person-leaving parking switch 31 is closed (person-leaving park) and the locked state A is entered upon pushing the switch 23 of the card CAD from the outside of the car. The person-leaving park switch 31 is opened (vacant park) and enters a locked state B by pushing the switch 23 of the card CAD from the outside of the car, and depressing the lock knob switch 36 of all doors of the vehicle. In a locked state C, the card CAD is not used. In each of the above cases, the nut bar 46 is located in the position shown in FIG. 4.

(2) Unlock from the Outside

The switch $22_1$ or $22_2$ of the card CAD is pushed. When the switch $22_1$ is pushed, only the door D1 of the driver seat will be unlocked. When the switch $22_2$ is pushed, all of the doors will be unlocked.

(3) Engine Start

An engine key (not shown) is inserted into an engine key cylinder (not shown) and is rotated to an ON position to close the key switch 2. The card CAD is inserted into the slot 19 and is pulled further therein by the rollers 20, 21. When the information of the ferromagnetic film 24 corresponds to the setting code of the switch DSW-2, the relay 4 is closed. The engine may then be started by rotating the engine key to the engine starting position. The card CAD is maintained in the slot 19 during operation of the vehicle. When a code corresponding to the setting code of the switch DSW-2 is not read by the head 16, the relay 4 remains open. When the engine key is rotated or the lead line of the engine key cylinder is shorted in this state, the engine will not start.

(4) Vehicle Start

When the door is opened or half-opened and the vehicle is traveling at a speed above $V_1$, a door buzzer rings continuously. If a door is closed, it will be automatically locked upon the vehicle reaching a higher vehicle speed.

(5) Engine Stop

When the key is pulled out of the key cylinder and the key switch 2 returns to an open state, the card CAD will be partially ejected out from the slot 19 and the buzzer of the driver-side door of the driver seat will ring intermittently. When the card CAD is pulled completely out from the slot 19, the buzzer stops ringing.

(6) The Person-Leaving Park Mode

The person-leaving park switch 31 is opened as the person exits the vehicle, and then the switch 23 of the card CAD is pushed from outside of the vehicle to lock the doors. When the switch $22_1$ or $22_2$ of the card CAD is not operated from outside of the vehicle, the door may not be opened, even if the inside handle switch $36i$ or the outside handle switch $36o$ is closed.

Next the actuation of the microprocessor 32 will be described.

The microprocessor 32 always receives the voltage $V_{cc}$ from the constant voltage circuit 12 so that the initialization of the microprocessor 32 is normally over and it is in a state allowing interruption. The interruption actuation of the microprocessor 32 is described with reference to FIG. 5c.

When the key code receiving device KCR does not receive an electric wave transmission from the card CAD, the output H is supplied to the interruption port INT of the microprocessor control. When the code is sent from the card CAD, the key code receiver KCR enters interrupt processing mode upon receiving a plurality of bits with an L value supplied at the beginning of the code word. In this state, the microprocessor 32 next reads a plurality of a code word bits indicating the open or close state of the switch DSW-1 and the switches $22_1$, $22_2$ and 23. The bits of the code word corresponding to DSW-1 are compared with bits representing the open and close data of the DIP switch DSW-2. If the bits are equal, the bits of the code word corresponding to the states of the switches $22_1$, $22_2$, and 23 are read and the driver door unlock indication or all door unlock indication or the lock indication (all doors) is judged. When the driver door unlock is indicated, the driver door unlock flag is set. When an all doors unlock is indicated, the all doors unlock flag is set. When all doors lock is indicated, the all doors lock flag is set.

When the open and close data portion of the DIP switch DSW-1 in the code word does not correspond to the open and close data of the DIP switch DSW-2 (keeping code data), it returns back directly to the main routine 2. The above-mentioned steps comprise the interruption control routine. When the card CAD transmits the code word indicating interrupt control, the microprocessor 32 immediately reads the data sent and sets the condition data flag for the next control operation.

Figure 5A:
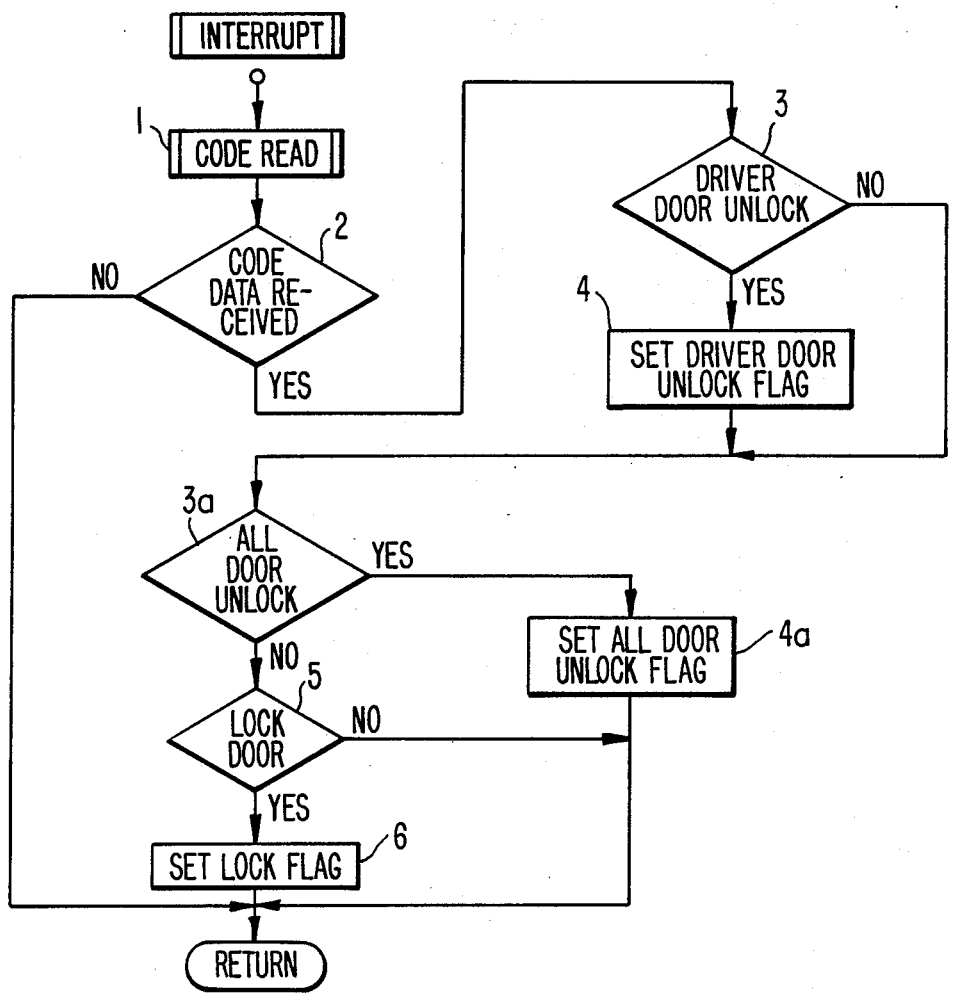
Figure 5B:
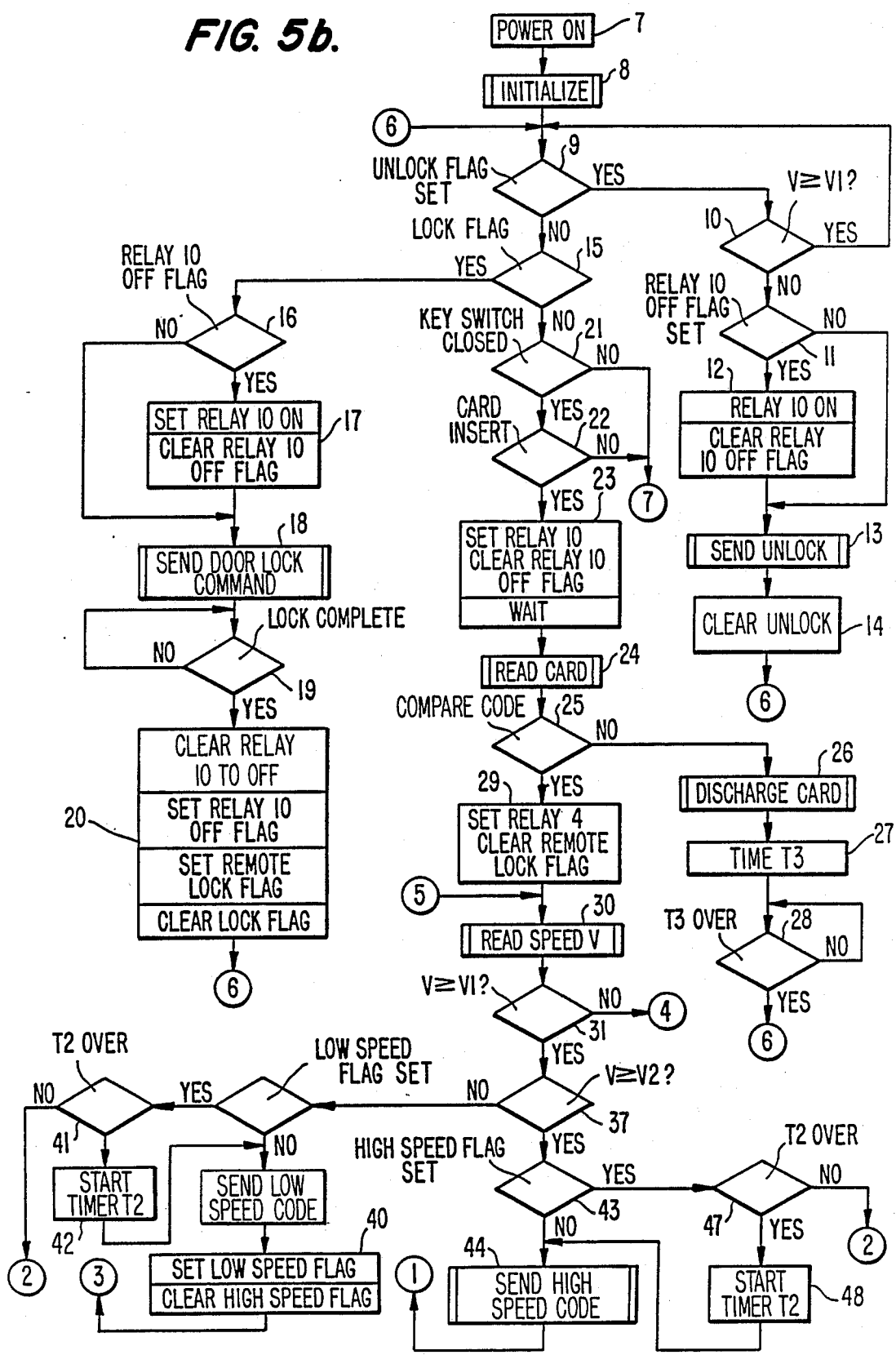
FIGS. 5b and 5c are flow charts showing additional control operations performed by the microprocessor 32.
Figure 5C:
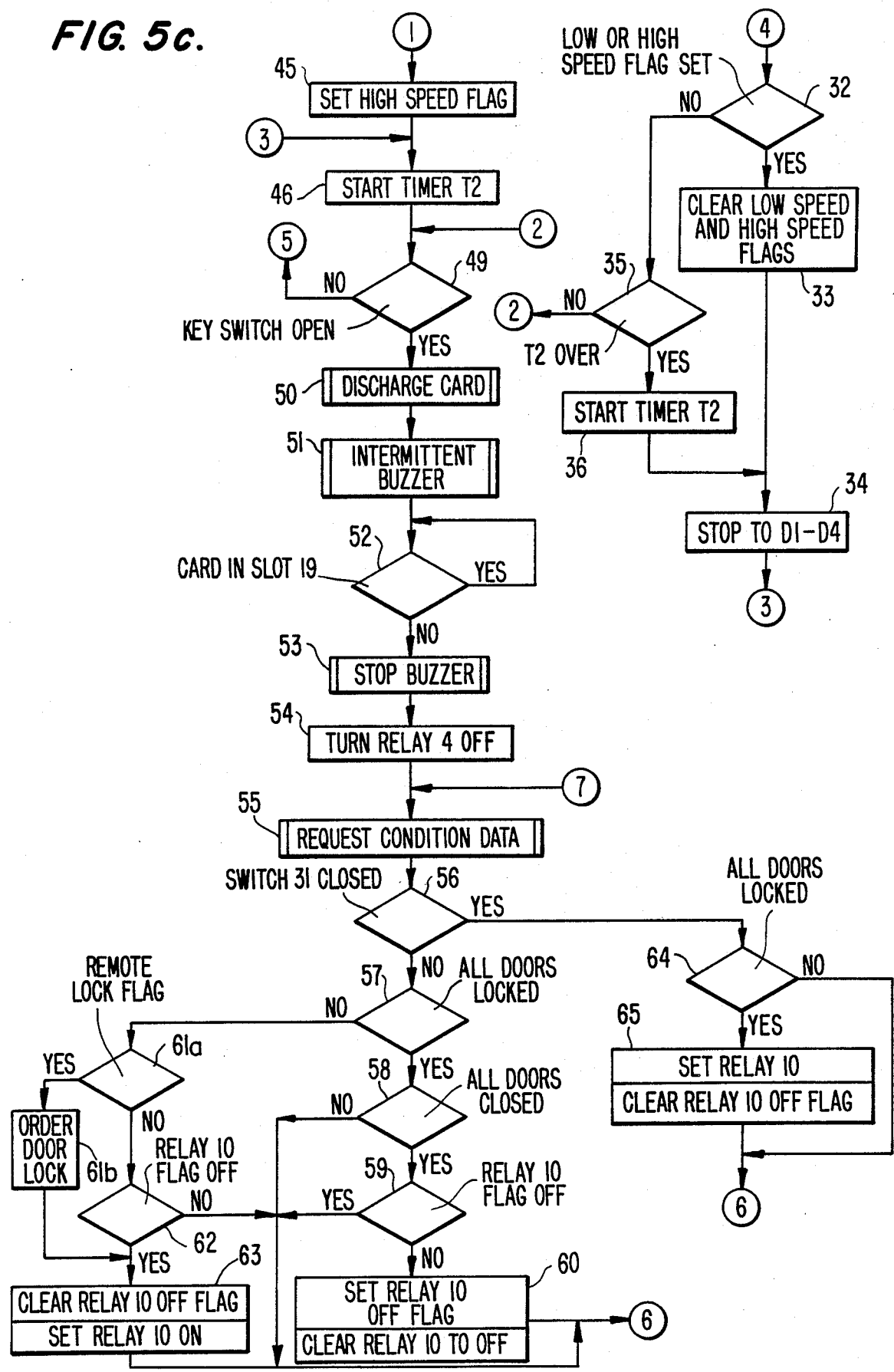

The main routine of the control actuation of the microprocessor 32 is shown in FIGS. 5b and 5c.

Upon power on, the microprocessor 32 performs an initialization routine and assumes a waiting state. The relay 4 is OFF, the relay 10 is OFF, the motor Mc is OFF, and the interrupt state is set. The microprocessor 32 sends initial condition data to the microprocessors associated with the doors D1 to D4 and sets the unlock state and the buzzer 40 to OFF.

When the unlock flag is set upon receiving unlock data from the card CAD and an interrupt, the vehicle speed V is compared to a low speed value, V1. When V is above the low speed value $V_1$, a loop of steps 9 and 10 is entered because the card CAD is being operated with the vehicle moving. No unlock operations will be enabled until the vehicle speed is under $V_1$.

When the vehicle speed becomes less than $V_1$, the relay 10 off flag is cleared if it is set and the relay 10 is set ON. Data indicating "unlock" is sent to the microprocessor 34 of the door D1 or the microprocessors for all of the doors D1 to D4. The unlock flag set during the interrupt is cleared and control is returned to step 9.

When the driver of the vehicle inserts the key into the key cylinder and closes the engine key switch 2, the microprocessor 32 goes from step 21 to 22 and waits until the card CAD is inserted into the slot 19. When the card CAD is inserted into the slot 19 and is detected by the switch 13, the microprocessor 32 goes from step 22 to 23 and relay 10 is set ON, relay 10 OFF flag is cleared, a wait state for a time $T_1$ is entered to permit the constant voltage circuit 11 to stabilize and generate the constant voltage $V_c$. A card read is then performed.

In order to read the card, the microprocessor 32 energizes the motor Mc to run at a constant speed and reads the output of the comparator 18. When the switch 14 detects the card CAD, the motor Mc is stopped. Accordingly, the code information stored on the ferromagnetic film on the card CAD is read by the microprocessor 32. The card CAD remains in the inside of the slot 19.

Next, the microprocessor 32 compares the data read from the ferromagnetic film 24 of the card CAD with the open and close data of the DIP switch DSW-2. When the data correspond to each other, the relay 4 it set ON, the remote lock flag is cleared and the lock of the ignition circuit IGC is released.

When the data read by the ferromagnetic film 24 of the card CAD does not correspond to the open and close data of the DIP switch DSW-2, the card is discharged at step 26 and a timer for counting the time period $T_3$ is set to prevent another card CAD from being inserted during the period $T_3$. Control returns to step 9 after waiting the time period $T_3$ to perform another card reading. If the information does not correspond to the code data, the entry and discharge actuation of the card CAD is repeated at the time interval $T_3$.

When the information obtained by reading the card corresponds to the code data set by the DIP switch DSW-2 and the relay 4 is ON to release the lock of the ignition circuit IGC the vehicle speed V is determined and outputted by the A/D converter 30. The A/D converter first provides a data bit synchronize pulse and each bit of the digital data showing the vehicle speed data V is read serially. Next, the speed V is compared with the low speed value $V_1$ and the high speed value $V_2$. When the vehicle speed V is under $V_1$, control transfers to step 32 in FIG. 5c because the vehicle is stopping or moving extremely slowly. The low speed flag indicating that the vehicle speed V is above $V_1$ and under $V_2$ is cleared and data indicating that the vehicle is stopping is sent to the microprocessors associated with the doors D1 to D4.

Upon $V_1 \leq V \leq V_2$, control transfers to step 38. If the low speed flag is not set, a low speed code is sent to the microprocessors 34 etc., the low speed flag is set, and the high speed flag is cleared.

Upon $V_2 \leq V$, control transfers to step 43, and if the high speed flag is not set, a high speed code is sent to the microprocessors 34 etc. and control transfers to step 45 in FIG. 5c where the high speed flag is set. For example, when the low speed flag indicates low vehicle speed ($V_1 \leq V \leq V_2$) under certain conditions, there is no need for again sending the low speed signal to the microprocessors associated with the doors D1 to D4. However, when the same state continues for a predetermined time period, the data for indicating the low speed code are retransmitted at intervals of $T_2$ as a precaution. The same is true in the event of high vehicle speed. Only when the engine key switch 2 is closed, i.e., during normal engine operation with the vehicle running or stopping, will the information on vehicle speed range be sent to the microprocessors associated with the doors D1 to D4.

When the engine key switch 2 is opened (step 49 in FIG. 5c), the card CAD is discharged. In this case the motor Mc is at first energized in the reverse direction and the switch 13 is driven until the card CAD is not detected. When the switch 13 no longer detects the card CAD, the motor Mc is temporarily stopped but will again be energized and stopped upon detecting the card CAD by the switch 13. Accordingly, the card CAD is stopped when it extends about halfway from the slot 19 and is detected by the switch 13.

The microprocessor 32 controls the intermittent operation of the buzzer in the driver-side door D1 if the card CAD is not fully removed from the slot 19. When the driver pulls out the card CAD entirely from the slot 19, the switch 13 no longer senses the presence of the card. The microprocessor 32 proceeds from step 52 to step 53 and the intermittent operation of the buzzer is stopped by the microprocessor 34 of the door D1 (53).

The microprocessor 32 turns the relay 4 OFF to lock the ignition circuit IGC (step 54) and requests condition data from the microprocessors associated with each door. For example, the microprocessor 34 receives the condition data showing the states of the switches MS and 36 to 38.

The microprocessor 32 reads the state of the person-leaving park switch 31 (step 56). When the switch 31 is closed (person-leaving park), the microprocessor 32 judges from the received condition data whether all doors are locked (switch MS open). If all doors are locked, a return is made to the initial step 9 of the main flow. When one of the doors is unlocked (switch 36 closed), the relay 10 is set ON and the off flag of the relay 10 is cleared for restoring the constant voltage circuit 11. In the steps 64 and 65, the microprocessor 32 energizes the motor M1 in the reverse direction. When all doors are not in the locked state, step 65 is not performed because at least one door is unlocked and it can be opened and there is no need for setting the relay 10 ON.

When the person-leaving switch 31 is open and the vehicle is vacant, control transfers from step 56 to step 57 and it is determined whether all doors are locked or not from the received condition data (step 57). When all doors are locked, it is determined from the condition data whether all doors are closed. If all doors are closed as indicated by switch 38 being closed, it is determined, whether the relay 10 off flag is set, i.e., whether the relay 10 is already OFF. When the flag exists, control returns to step 9. When the flag is not set, the relay 10 is cleared to OFF, the relay 10 off flag is set, and control returns to step 9.

When all doors are not closed, control returns to step 9 to wait for the open door to be closed. When control returns to step 9, it goes back from step 21 to step 55 to obtain the condition data of each door. At this state, the opening of the door is determined by the closing of the lock knob switch 36 and either the inside handle switch 36i or outside handle switch 36o. When a person exits the vehicle and the door is closed, it will be automatically locked. All doors are set into the locked state and the remote lock flag is set in spite of the condition of the lock knob switch 36 in accordance with the operation of the switch 23 of the card CAD from outside of the vehicle. This occurs after the sequence wherein the lock knob switch 36 is closed, the inside handle switch 36i is closed, the door is opened, a person exits the vehicle, and the door is closed.

When all doors are not locked (the switch MS of at least one door is closed (unlocked)), control transfers from step 57 to step 61a. When there is a remote flag, a door lock command is sent to the microprocessor of the door that is not locked because all doors must be locked in response to the transmission of a lock signal by the card CAD operated from outside the vehicle in the vacant park made.

When there is no remote flag (when a lock command is not transmitted from outside the vehicle), the relay 10 off flag is cleared and the relay 10 is set ON. Control returns to step 9.

When all doors are closed, the person-leaving park switch 31 is closed, the key switch 2 is OFF (stopping), the card CAD is pulled out from the slot 19, and the electrical source for enabling unlock is restored even if all doors are locked. When all doors are closed in the lock state, the person-leaving park switch 31 is open (the vehicle is vacant with the key switch 2 OFF), the card CAD is pulled out from the slot 19, the electric source 11 is turned OFF and the lock cannot be released by the switching operation of the doors D1 and D4. When there is no remote lock flag and at least one door is unlocked, the electrical source 11 is restored, even if the person-leaving park switch 31 is open (vacant), so that lock driving according to the lock command is performed.

When all doors are closed and the person-leaving park switch 31 is open (vehicle is vacant), there is a remote lock flag when the key switch 2 is OFF and the card CAD is pulled out from the slot 19, all doors will be held in the locked state and cannot be opened. This is because the electrical source 11 is OFF and all doors are locked even if an outside handle switch 36o, lock knob switch 36, or inside handle switch 36i is operated.

Referring to the remote lock control, the microprocessor 32 periodically returns to steps 9, 15, 21. When the microprocessor 32 receives a signal from the card CAD, the unlock flag or the lock flag is set by the resultant interrupt. The control actuation is as aforementioned, when the unlock flag is set.

When the switch 23 of the card CAD is operated and the lock flag is set, control transfers to step 16 from step 15. The microprocessor 32 determines the existence of the relay 10 off flag. When there is a relay 10 off flag, the relay 10 is set ON and the relay 10 off flag is cleared. When there is no relay 10 off flag, control transfers to step 18 because the relay 10 is already ON.

In step 18, the microprocessor 32 sends data ordering a state for the doors D1–D4 associated with the microprocessors. When data indicating "abnormal" operation is not sent from the microprocessor 34 of the door D1, etc. within a predetermined time, the relay 10 is cleared to OFF, the relay 10 off flag is set, the remote lock flag is set, and the lock flag is cleared because it is considered that the lock operation has been finished.

The lock and unlock control actuation of the microprocessor 34 of the driver-side door D1 is described hereinafter. The control actuation of the microprocessors associated with the doors D2 to D4 is quite similar to the actuation of the microprocessor 34. The contact with the electric source 12 and the microprocessor 32 is also quite similar.

In FIGS. 6a to 6d the output voltage $V_{cc}$ of the constant voltage circuit 12 is supplied to the microprocessor 34, so that the electric source is always ON after contacting the circuit 12 with the battery 1. The microprocessor 32 interrupts the microprocessor 34 to send control data to the microprocessor 34. The interrupt control of the microprocessor 34 is described.

Figure 6A:
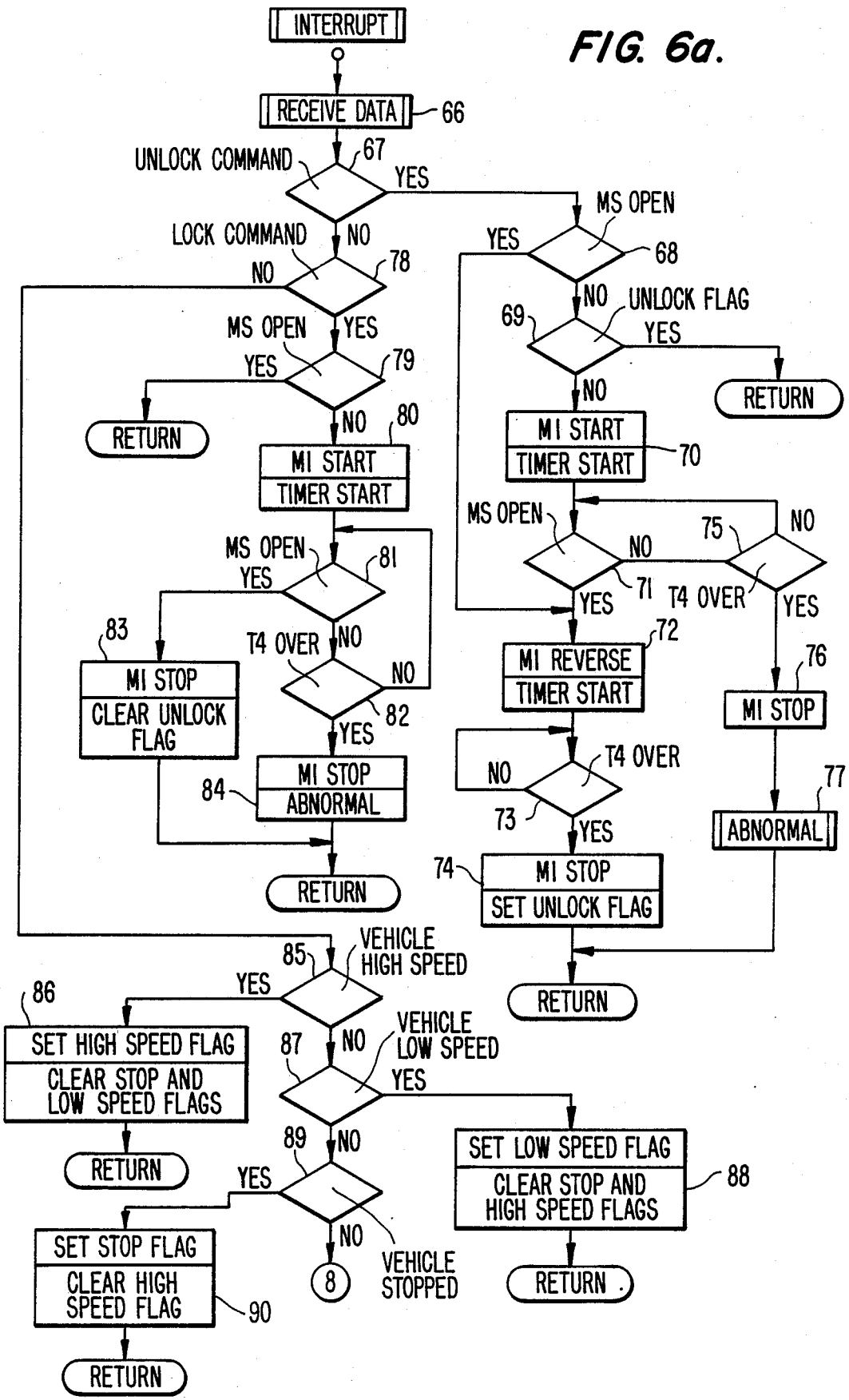
FIGS. 6a and 6b are flow charts showing entry control operations of a microprocessor 34 associated with the driver-side door D1 of a vehicle.
Figure 6B:
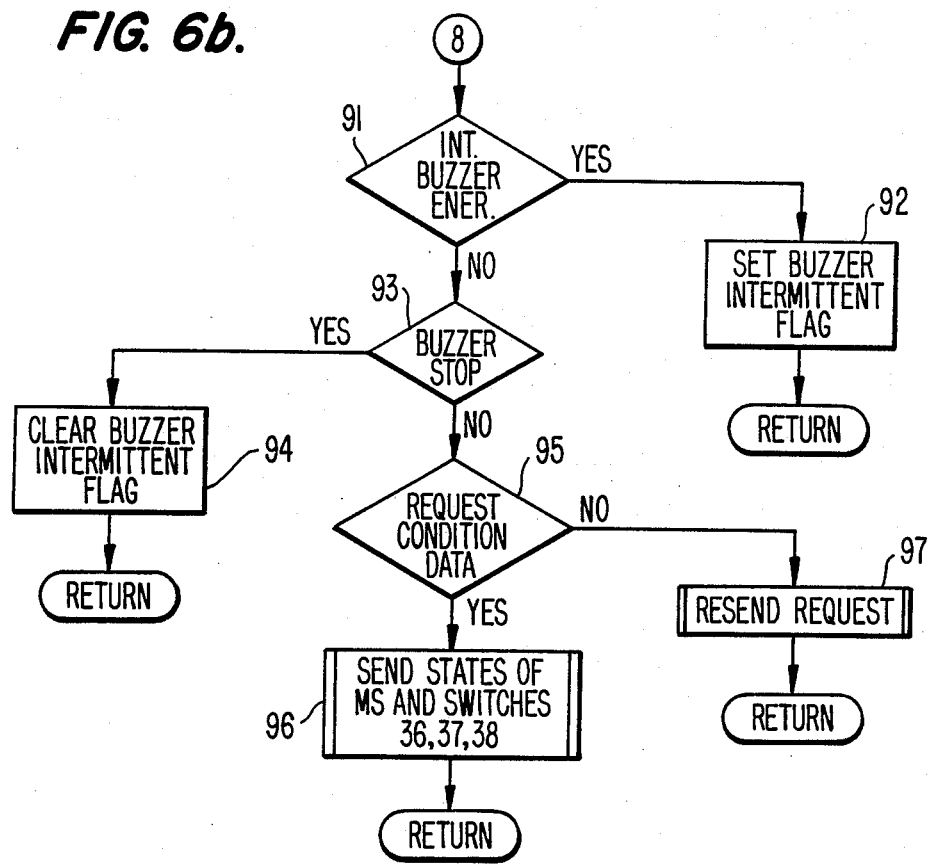

In FIG. 6a, when the microprocessor 32 changes the interruption port INT to L, the microprocessor 34 enters the interrupt operation control sequence shown in FIG. 6a and reads the serial data sent to a port Ip (step 66). The data received is decoded, however, when it is unlock indicating data control transfers to the unlock control sequence that begins with step 68. When it is lock indicating data, control transfers to the lock control sequence beginning with step 79. If it is other data, control transfers to step 85.

Figure 6C:
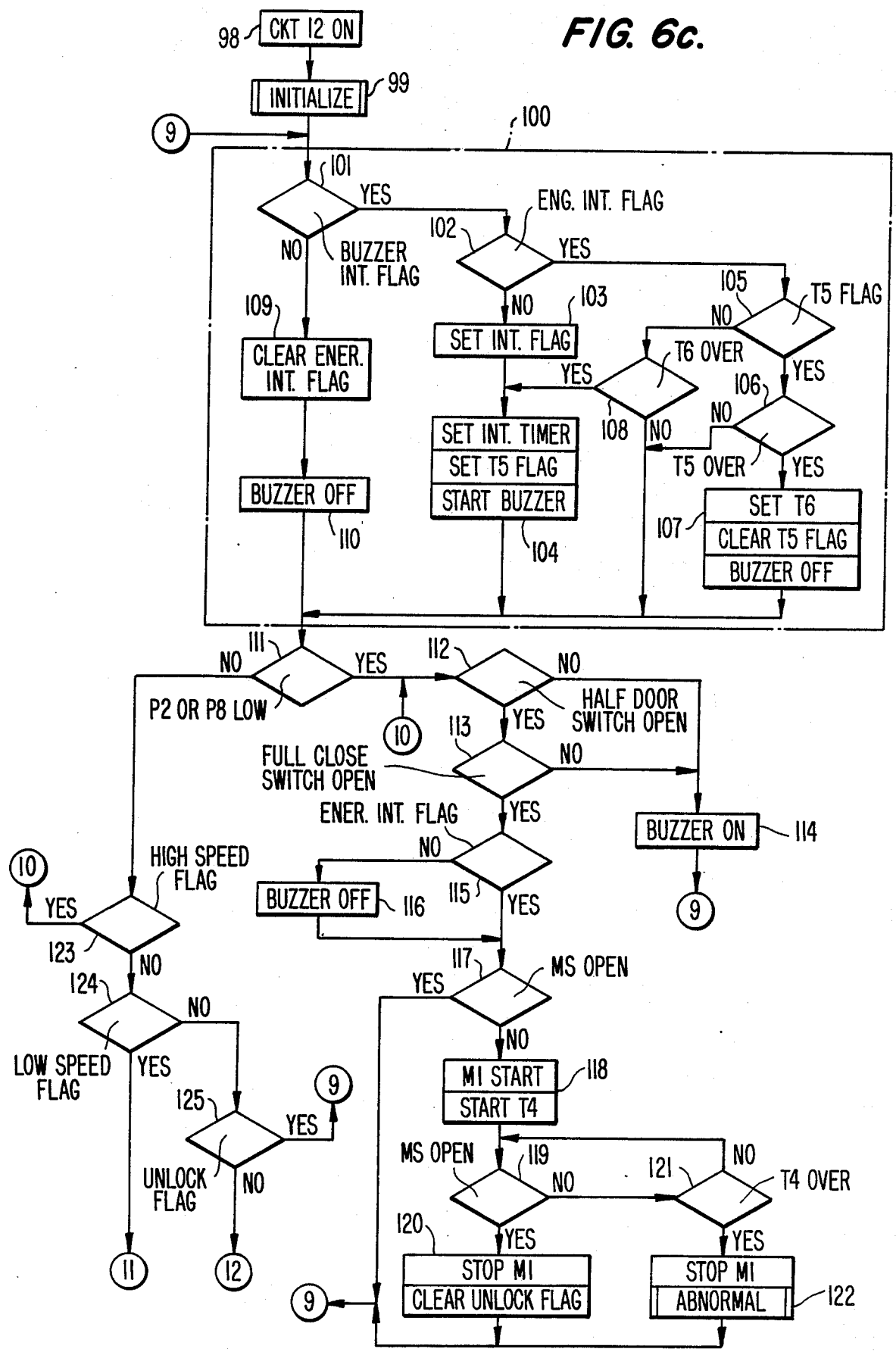
FIGS. 6c and 6d are flow charts showing additional control operations performed by the microprocessor 34.
Figure 6D:
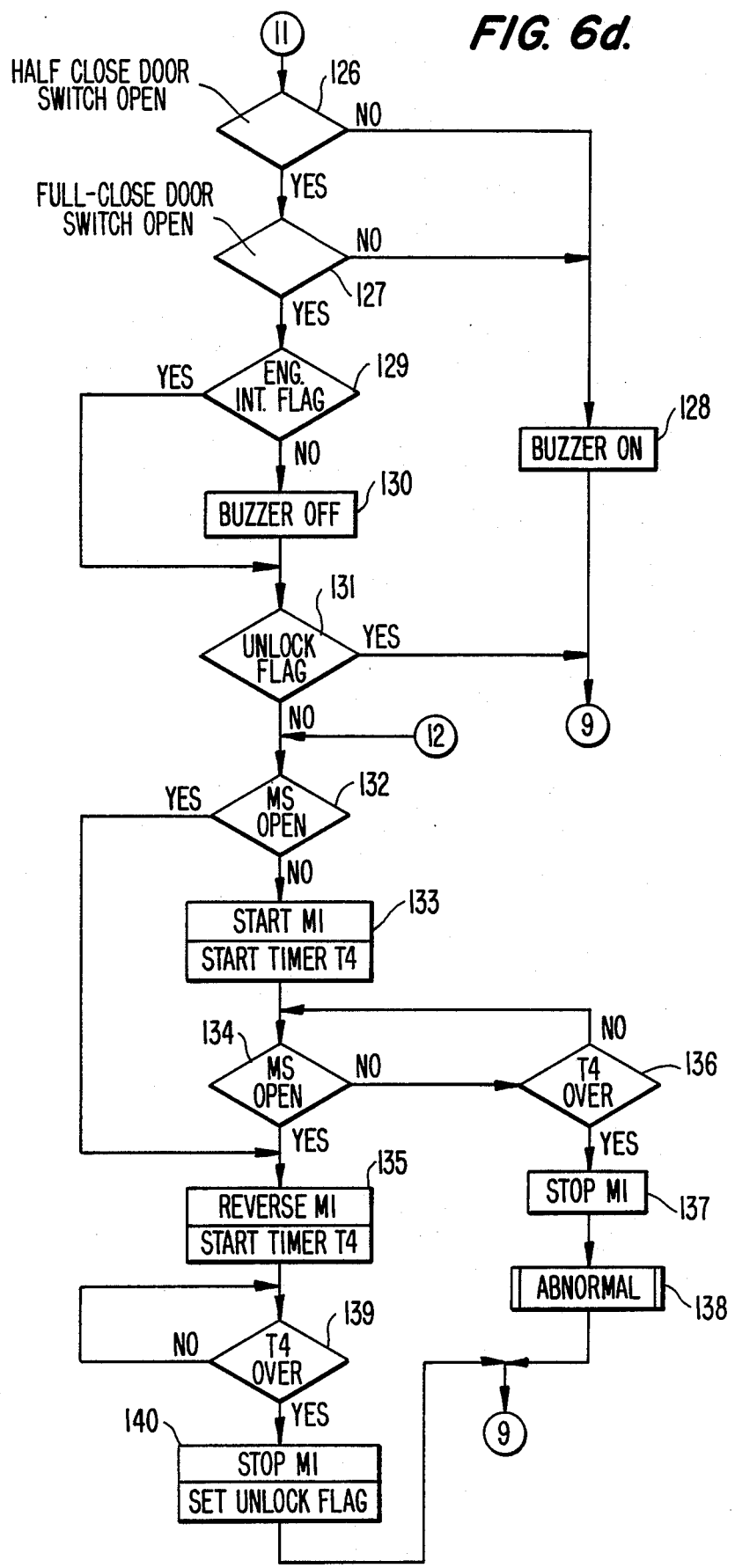

Assuming that the data transferred is an unlock command, the unlock control operation sequence beginning with step 68 is performed. If the switch MS is open to indicate the lock state, the motor M1 is energized and a timer for determining a T4 time limit, i.e., the time required for moving the nut bar 46 from the lock position in FIG. 4 to the unlock position, is set. When the time period T4 has passed, the motor M1 is stopped and the unlock flag is set to show that the nut bar 46 has been driven to the unlock position. Control is returned to the main routine (FIGS. 6c and 6d).

When the switch MS is closed and indicates that the nut bar 46 is not located at the lock position, the existence of the unlock flag indicates that the nut bar 46 has already been driven to the unlock position. Control returns to the main routine.

When there is no unlock flag, it is possible that the nut bar 46 is located between the lock position and the unlock position, or that the switch or the microprocessor itself is malfunctioning. The motor M1 is energized, the timer T4 is set, and a condition change of the switch MS from closed to open is expected as the nut bar 46 should be moved to the lock position which is its base point. When the switch MS becomes open after period T4 (step 71), the nut bar 46 has reached the lock position and control transfers to the unlock driving control sequence under step 72. If the switch MS does not become open and the period T4 has expired, the motor M1 is stopped and data indicating an abnormal condition is sent to the microprocessor 32. The microprocessor 32 performs an error routine. The hardware and the control actuation comprising the error routine are not shown. when the microprocessor 32 receives data indicating an abnormal condition, an indicating lamp identifying the the door involved is switched on.

Assuming that the microprocessor 34 receives the lock indicating command data from the microprocessor 32, the lock control sequence beginning with step 79 is performed. If the switch MS is open to indicate the lock state, control returns to the main routine. If the switch MS is not open (lock state), the motor M1 is energized and a timer having the period T4 is set. The motor M1 is stopped when the switch MS is open and control returns to the main routine. Data indicating an abnormal condition is sent to the microprocessor 32 if the switch MS does not open within the period T4. In that event, the microprocessor 32 switches on an indication lamp indicating an error condition and indicating the door causing the condition.

The microprocessor 32 sends the vehicle speed range data to the microprocessor 34. When the vehicle speed range data indicates "high speed" (step 85), the high speed flag is set and the stop and low speed flags are cleared. Control is returned to the main routine. When the vehicle speed range data indicates "low speed" (step 87), the low speed flag is set and the stop and high speed flags are cleared. Control is returned to the main routine.

When the microprocessor 32 sends a buzzer intermittent energization command data to the microprocessor 34, control passes from step 91 to step 92 and a buzzer intermittent energization flag is set (step 92). Control then returns to the main routine. When the microprocessor 32 sends buzzer stop indication data to the microprocessor 34, control passes from step 93 to step 94 and a buzzer intermittent energization flag is cleared.

When the microprocessor 32 sends a request for condition data to the microprocessor 34 (step 95), the microprocessor 34 sends data indicating the states of the switches MS and 36 to 38 to the microprocessor 32. The microprocessor 32 interrupts the microprocessor 34 and performs a data receive sequence (step 66). If the data received cannot be read, however, the microprocessor 34 sends a data resend request to the microprocessor 32.

When the electric source becomes ON, i.e., when the the output voltage $V_{cc}$ of the constant voltage circuit 12 becomes constant, the microprocessor 34 performs the initialization routine (step 99) in FIG. 6c. At this initialization an inside register and inlet and outlet ports are set to the initial state (motor stop, buzzer stop) and the state of the lock switch is read. When the lock switch is open, the nut bar 46 is driven to the lock position (FIG. 4), and when it is closed, the nut bar 46 is driven to the unlock position.

Next the microprocessor 34 refers to the existence of the buzzer intermittent energization flag (step 101). When there is no buzzer intermittent energization flag, an energization initiating flag is cleared (this is also cleared at the time of initialization) and the buzzer 40 is stopped. When there is the buzzer intermittent energization flag as indicated by the microprocessor 32 through an interrupt, the existence of the energization initiating flag is tested to see if buzzer intermittent energization is already initiated. When there is no energization initiating flag, the energization initiating flag is set (steps 102, 103), the timer deciding the energization term of the intermittent energization and the T5 indicating flag are set, and the buzzer 40 is started.

If there is the energization initiating flag, the existence of the T5 flag is tested (step 105) and it is determined whether the interval T5 is over or not. When the interval T5 is over, an interval T6 is next set and the T5 flag is cleared and the buzzer 40 is turned OFF. When the interval T6 is over, control transfers from step 108 to step 104 and the buzzer is energized.

The energization of the buzzer 40 occurs for interval T5, and the buzzer is OFF for the interval T6. This intermittent operation continues as long as there is the buzzer intermittent energization flag. When the buzzer stop indication is received as a result of an interrupt, the buzzer intermittent energization flag is cleared. The buzzer intermittent energization is continued from the instruction for buzzer intermittent energization until a stop command is issued by the microprocessor 32.

The control sequence beginning with step 111 is performed during the intermittent energization of the buzzer 40 and also during the stop thereof. That is to say, the states of inlet ports P8 and P2 are tested, and when P8 is L indicating that the lock knob switch 36 is closed and the inside handle switch 36$i$ is closed, or when P2 is L indicating that the lock knob switch 36 is closed and the outside handle 36$o$ is closed, unlock control under step 123 is performed. If the ports do not have those states, control passes to step 112.

When P8 is L or P2 is L, the high speed flag is tested (step 123). When there is the high speed flag, control passes to the lock control sequence under step 112 because the car is running at high speed. When there is no high speed flag, the low speed flag is tested (step 124), and if there is no low speed flag, i.e., the vehicle is moving at an extremely low speed or is stopped, the unlock flag is tested. When there is the unlock flag, control transfers back to step 101 because the door is already unlocked. When there is no unlock flag, the unlock sequence of steps 132 to 140 is performed in FIG. 6$d$. This unlock sequence is quite similar to steps 68 to 74 of FIG. 6$a$, so further description thereof is omitted.

When there is a low speed flag at step 124, the state of the half door switch 37 is determined because the vehicle is running. If the half door switch 37 is closed, the buzzer 40 is energized because the door is open. Control returns to step 101. When the switch 37 is open, the state of the full close switch 38 is determined (step 127). When the switch 38 is open and there is no energization initiating flag, the buzzer 40 is changed to OFF (step 130). If the door is fully closed the unlock sequence of steps 132 to 140 will be performed. It the door is unlocked at low vehicle speed, and an attempt is made to open the door, the buzzer 40 rings continuously upon occurrence of the half door flag. The buzzer 40 rings continuously also upon full opening of the door.

When inlet ports P8 and P2 are H indicating that the inside handle switch 36$i$ and outside handle switch 36$o$ are open and the vehicle is running at high speed, control transfers to the lock control sequence under step 112 where the state of the half door switch 37 is tested. If the switch 37 is closed, the buzzer 40 is energized because the door is open. The state of the full close switch 38 is tested upon the open state of the switch 37, and if the switch 38 is closed the buzzer 40 is energized because the door is half open. When the door is fully closed the switch 38 is open and the buzzer 40 is stopped if there is no energization initiating flag (step 116). The lock actuation sequence of steps 117 to 122 is than performed. The lock actuation is quite similar to the lock control actuation of steps 79 to 84 in FIG. 6$a$, and will not be further described.

In the above-mentioned embodiment, the microprocessors associated with the doors D1 to D4 energize the motor M1 in the forward and reverse directions in accordance with lock and unlock commands from the microprocessor 32 and the states of the lock knob switch 36, the inside handle switch 36$i$ and the outside handle switch 36$o$, etc. to lock and unlock the appropriate door. Further, the microprocessor 34, etc. performs lock and unlock control and the buzzer energization control in accordance with the vehicle speed indications from the microprocessor 32 and the states of the door full or half open switches 37, 38.

The microprocessor 32 controls the ON and OFF states of the relays 4 and 10. The microprocessor 32 keeps relays 4 and 10 OFF to prevent theft of the vehicle by preventing the engine from being started and the door from being unlocked. The constant voltage circuit 11 is disconnected from the battery when the relay 10 is OFF and the electric source is not supplied to the motor driver 35 etc. of the door. The door cannot then be unlocked even if the microprocessors associated with the doors is actuated.

In this embodiment, a door lock apparatus such as the door lock apparatus shown in FIG. 4 may be adapted for the trunk or luggage door of the vehicle and a control unit such as the one for door D1 and shown in FIG. 1 may be connected to the microprocessor 32.

In the above-mentioned embodiment, the vehicle side windows are driven by a hand driving mechanism, so that the microprocessors associated with the doors D1-D4 do not raise and lower the side windows. If a door is supplied with a window driving electrical mechanism and a window open and close switch, a motor driver for energizing the motor of the electrical mechanism may be controlled by the microprocessor 34 and the window driving control will be done in accordance with window open and close commands sent from the microprocessor 32 and the present condition of the window open and close switch. The output $V_c$ of the constant voltage circuit 11 is applied to the motor driver for energizing the window driving motor, and the microprocessor 34 of the door will cause the window to be fully closed upon receiving a lock command from the upper microprocessor 32 and the existing condition of the window open and close switch. In this case, when the lock command is issued with the person-leaving park switch open (vacant vehicle) by utilizing the card CAD, the window will not open, because the electric source of the motor driver of the window driving motor is OFF.

In the aforementioned embodiment, the person-leaving park switch 31 is located near the driver seat and the locking and unlocking of the doors D2 and D4 cannot be controlled from the driver seat. In another embodiment according to the present invention, switches for controlling the locking and unlocking of the doors D2 to D4 are provided near the person-leaving park switch 31. Therefore, when these switches are operated, the microprocessor 32 sends the lock command or the unlock command to each of the doors D2 to D4.

Also, in the aforementioned embodiment, the microprocessor 34 of the door D1 is actuated under the control of the microprocessor 32 and the states of the switches of the door portion. It is contemplated, however, that a lock continuing command can be, for example, sent from the upper microprocessor 32 to the microprocessor 34 and the microprocessor 34 of the door D1 can continue the lock state until a command for the release of the lock continuation is received.

Further in the above-mentioned embodiment, data are exchanged by utilizing the microprocessor 32 and the microprocessors associated with the doors D1-D4. It can, however, be performed such that the control of the microprocessor 32 and the microprocessors associated with the doors D1-D4 will be done by one computer system including one microprocessor or a plurality of microprocessors.

As above-mentioned, the door becomes unlocked upon the opening of the person-leaving part switch (vacant vehicle) and upon selection of the remote lock state, i.e., when the vehicle is locked as a result of the actuation of the card CAD from outside the vehicle, even if the switch of the door portion is operated. This makes it much more difficult to steal the vehicle. Further, if the code of the card CAD does not correspond to the code maintained by the microprocessor 32, the engine ignition circuit IGC cannot be actuated, so that the effect for prevention of theft is even greater.

Figure 7:
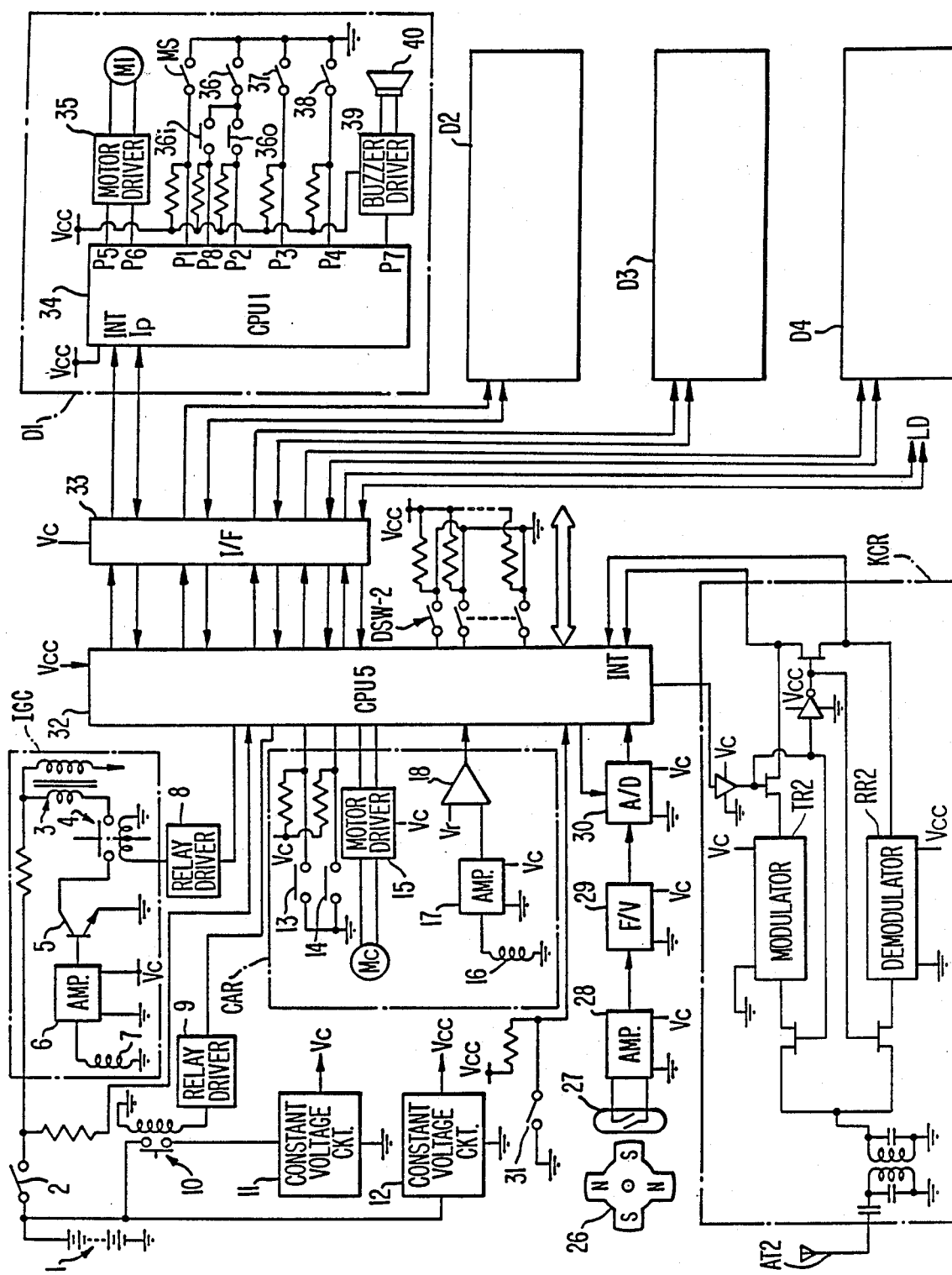
FIG. 7 is a block diagram showing a second embodiment of a control system for the locking device according to the present invention.

Referring now to FIG. 7, a second embodiment according to the present invention will be hereinafter described. A microprocessor also adapted for a trunk or luggage door LD is also connected with the interface 33. In this embodiment, when an electrical signal of a predetermined frequency is not received upon receiving the code data, the output of a demodulator RR2 is H, and when an electrical signal of a predetermined frequency is received and the code data is modulated, the output of the demodulator RR2 becomes L. A constant voltage $V_{cc}$ is supplied to the demodulator RR2 of the key code receiver KCR, the microprocessor 32, and the microprocessors associated with the doors by the constant voltage circuit 12. The microprocessor 32 is connected with the key code receiver KCR, controls the connection of the demodulator RR2 with an antenna AT2, and enables the transfer of the output of the demodulator RR2 to the microprocessor 32.

The key code receiver KCR includes a modulator TR2 energized by the output voltage $V_c$ of the constant voltage circuit 11. When the microprocessor 32 supplies the unlock code change information to the card CAD, the output terminal of the modulator TR2 is connected with the antenna AT2, the demodulator RR2 is disconnected from the antenna AT2, and change data is sent to the modulator TR2.

Figure 8A:
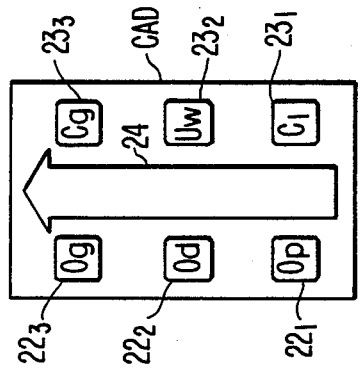
FIG. 8a is a plane view showing a surface of a card CAD for providing a code data.
Figure 8B:
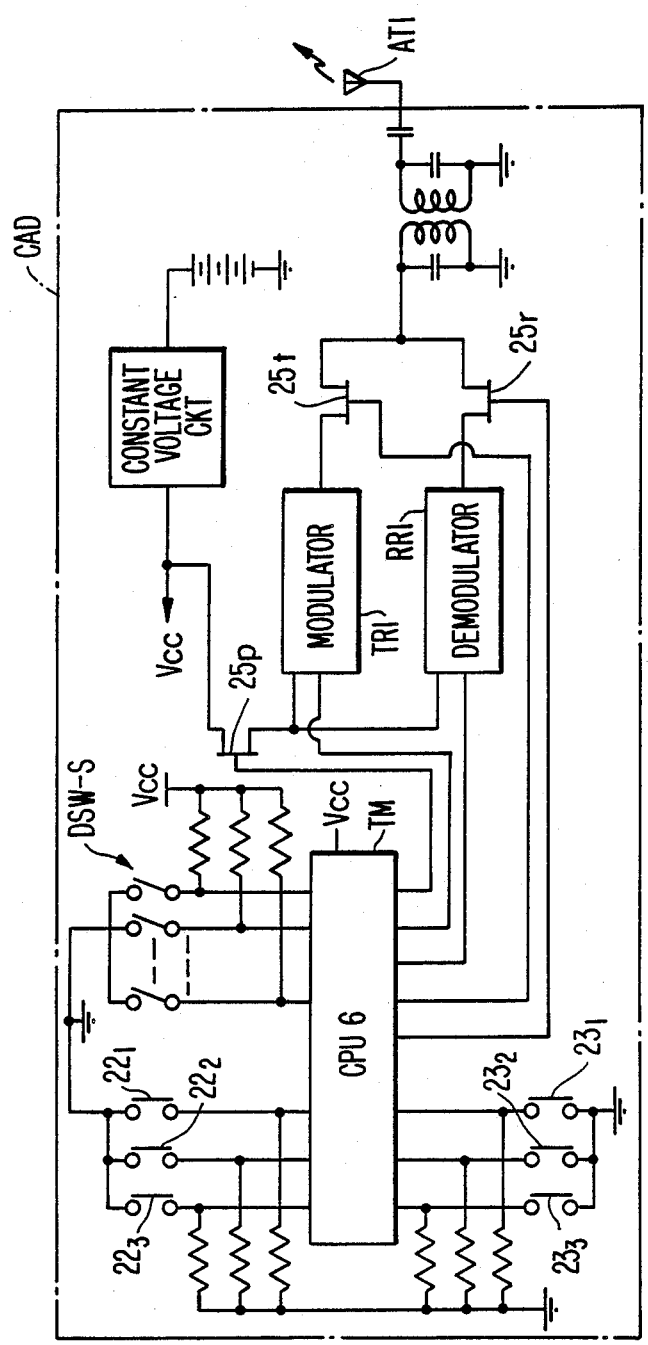

As shown in FIGS. 8a and 8b, the card CAD includes an all doors unlock switch $22_1$, a driver seat door unlock switch $22_2$, a luggage door unlock switch $22_3$, an all doors lock switch $23_1$, a window glass full close switch $23_2$ for all doors, and a luggage door lock switch $23_3$. When the unlock switches $22_1$-$22_3$ or the lock switches $23_1$-$23_3$ are closed, code data indicating the state of the switches $22_1$ to $22_2$, $23_1$ to $23_3$ and the state of switch DSW-S are supplied from the microprocessor TM to the modulator TR1. The modulator TR1 appends a predetermined number of bits having a L value to the beginning of the code data and the code is transmitted by the antenna AT1 after modulation. The last 6 bits of the transmitted code data may, for example, be the lock and unlock data indicating the status of the switches $22_1$ to $22_3$, and $23_1$ to $23_3$.

When the code data received by the microprocessor 32 corresponds to the code that is stored therein, the code data changing information is sent to the card CAD and the control operations to implement the work indication data, i.e., the open and close states of the switches $22_1$-$22_3$ and $23_1$-$23_3$.

In FIGS. 1b and 4, the lock knob switch 36 opened or closed by the lock knob (close to unlock, open to lock) is closed when the nut bar opposition detecting switch MS is closed. When the inside handle switch 36i or the outside handle switch 36o is closed (unlock indication) by operating the inside handle or the outside handle, the motor M1 is rotated and the bending projection 45a is pushed by the nut bar 46 and the pawl 43 is rotated into the counterclockwise direction to disengage the pawl 43 from the latch member 42 and to open the door, i.e., release the latch. The motor M1 is not started upon the open state (lock) of the nut bar position detecting switch MS, even if the inside handle or the outside handle is operated upon a special condition of the vehicle, e.g., low or high vehicle speed.

In this second embodiment, the trunk or luggage door LD is not supplied with the lock knob switch. The luggage door may be unlocked only when an unlock command is sent from the microprocessor 32. At that time the lock is released by operating the outside handle for state A of the first embodiment. In state B, all doors will not be unlocked and openable, even if the lock knob switch 36 becomes unlocked (close) and the inside handle switch 36i or the outside handle 36o becomes closed (unlock).

When the switch $22_1$ of the card CAD is pushed, the doors D1-D4 are unlocked. When the switch $22_2$ is pushed, just the driver seat door D1 is unlocked. In order to open the trunk or luggage door LD, the switch $22_3$ must be pushed.

Upon starting the engine, the card CAD is inserted into the slot 19. Accordingly, the card CAD is pulled into the inside of the slot 19 and the relay 4 is closed. If the information on the ferromagnetic film 24 corresponds to the set code of DSW-2, the engine key switch 2 may be rotated to the engine start position (closed) to energize the starter and start the engine. The card CAD will be maintained in the slot 19 during vehicle operation. When the code corresponding to the set code of DSW-2 is not read by the head 16, the relay 4 remains open and the engine may not be started even if the engine key switch 2 is operated or the electric reed of the engine key switch 2 is shorted.

The engine is stopped by opening the engine key switch 2 and the card CAD is urged halfway out of the slot 19. The buzzer of the driver seat door D1 intermittently rings. When the card CAD is pulled completely out from the slot 19, the ringing of the buzzer is stopped.

If the person-leaving park switch 31 is closed and the switch $23_1$ of the card CAD is activated outside of the vehicle, the lock may be released when the lock knob switch 36 of the doors D1 to D4 within the vehicle is operated (closed) and the inside handle switch 36i or the outside handle switch 36o is closed.

If the person-leaving park switch 31 is open and the switch $23_1$ of the card CAD is activated from outside of the vehicle, the door may not be opened if the switch $22_1$ or $22_2$ of the card CAD is not operated. This is true even if the lock knob switch 36 and the inside handle switch 36i or the outside handle switch 36o are operated.

Figure 9A:
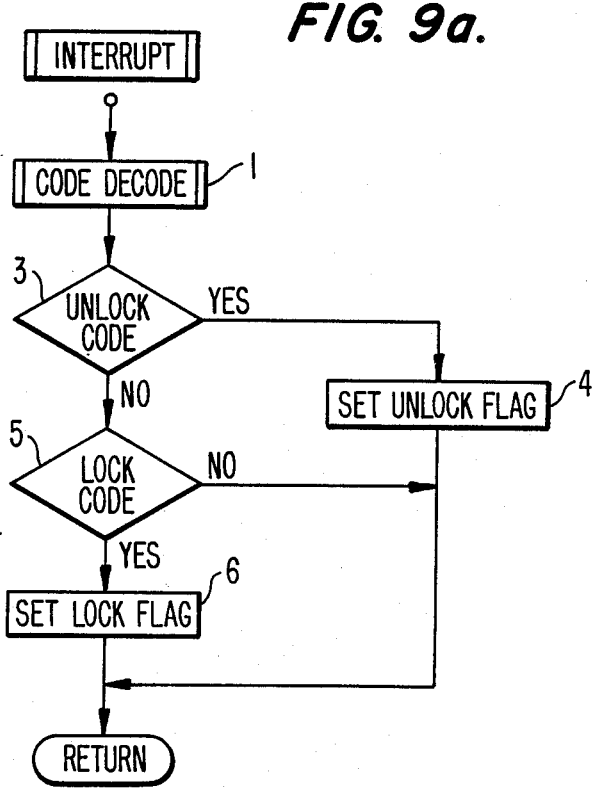
FIGS. 9a and 9b are block diagrams showing the entry control operations of a microprocessor 32 of FIG. 7.
Figure 9B:
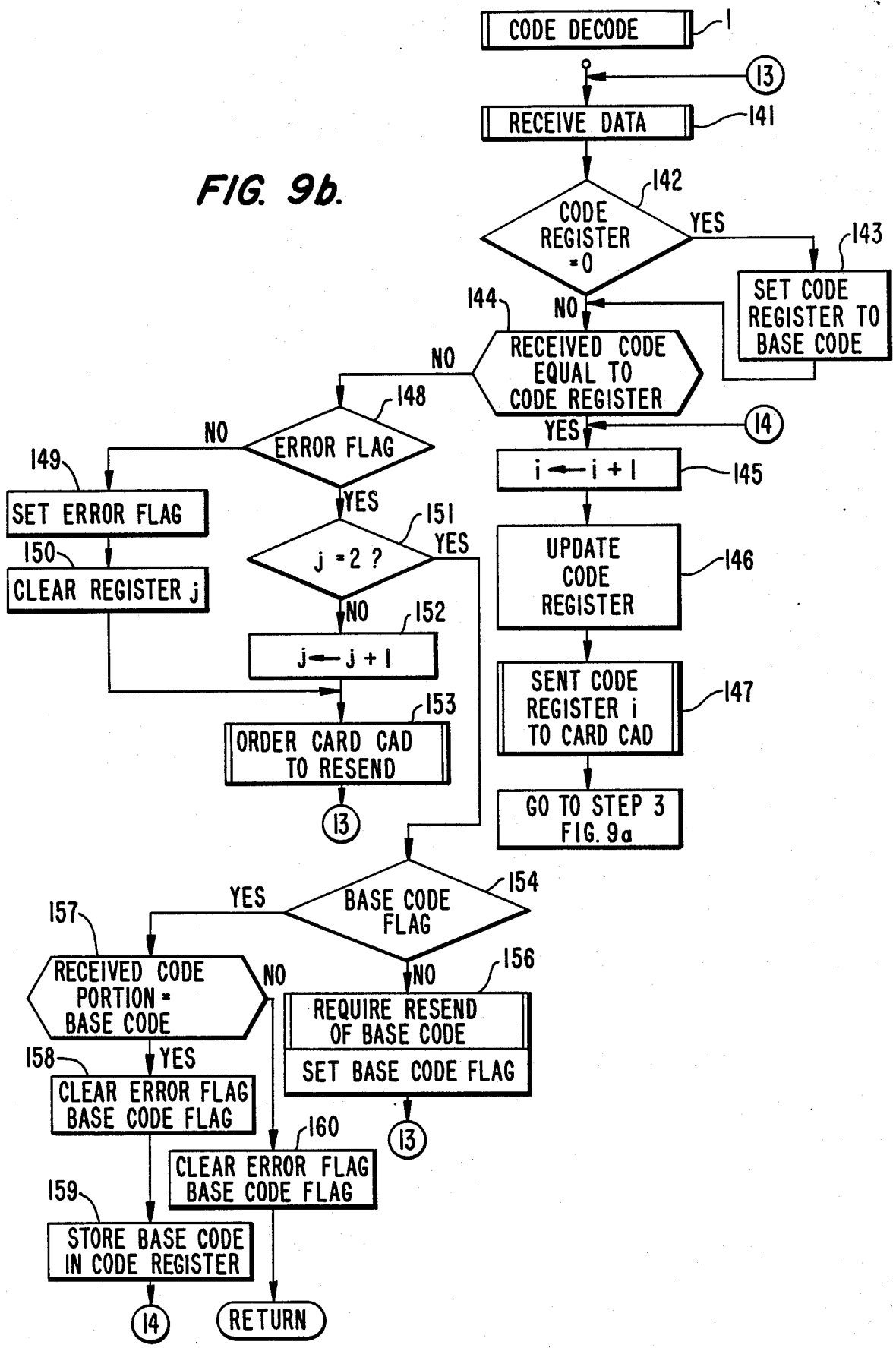

As shown in FIG. 9b, the microprocessor 32 receives the data including a predetermined number of leading bits of L value, a plurality of succeeding bits representing a code word and including the states of the switches $22_1$ to $22_3$, $23_1$ to $23_3$) (step 141). The microprocessor 32 checks the content of the code register storing code for comparison (step 142). When the code register is O, the base code (open and close data of DIP switch DSW-1) is transferred to the code register because it is the first time to receive code data after the circuit 12 is connected with the battery 1.

When the content of the code register is not O at step 142, the microprocessor goes directly to step 144, because code data has already been received at least once.

At step 144, the microprocessor 32 compares the code data of the receiving data with the content of the code register. When they are identical, the content of the receiving number register i is incremented by one (step 145). The content of the register number i is sent to the card CAD to send change information. Accordingly, the code data becomes different from the previous one. The card CAD receives the change information (content of register number i) and recognizes the next code data in which the change information is added to the data stored at that time. When the content of the number register i is sent, the microprocessor 32 goes to step 3 in FIG. 9a.

When the received code and the content of the code register are not identical, the microprocessor 32 checks for an error flag (step 148). If there is no error flag, the error flag is set (step 149), the register j maintaining the receiving error number is cleared (step 150), and the code resending requirement is sent to the card CAD (153). The data from the card CAD is again received at step 141.

If the received data is this time identical with the content of the code register, control transfers to step 145. If the retransmitted data is not identical as received with the content of the code register, control transfers to step 148. Since the error flag is set this time, the content of the register j is compared to 2 and if it is equal to 2 it means that errors occurred three times in the received data. When the content of register, is not 2, the register j is incremented by 1 and the code resending requirement is again forwarded to the card CAD.

When the content of the register j becomes 2, the existence of the base code flag is tested (step 154), and if there is no base code flag, a base code sending command is forwarded to the card CAD and the base code flag is set (step 156). When the card CAD forwards the data (base code=status of DSW-S), control transfers from step 154 to step 157 and the code portion of the received data is compared with the status of DSW-2 of the microprocessor 32 (step 157). When the compared codes are identical, the error flag and the base code flag are cleared (step 158), the base code is stored in the code register (step 159), and control transfers to step 145. When the codes are not identical the error flag and the base code flag are cleared (step 160) and control returns to the main routine (FIGS. 9d, 9e). The flag for beginning the door lock and unlock control is not set.

When the change information (content of the number register i) is sent to the card CAD at step 147, the microprocessor 32 goes to step 3 in FIG. 9a. When the data indicating the closing of any switches $22_1$ to $22_3$ is transmitted after the code data, the unlock flag is set (step 4). If data indicating the closing of any switches $23_1$ to $23_3$ is transmitted, the lock flag is set (step 6) and control transfers to the main routine (FIGS. 9d, 9e). The received code word is tested and the designated lock or unlock operation is performed.

When one of switches $22_1$ to $22_3$ or $23_1$ to $23_3$ of the card CAD is pushed, the base code, which is the open and close data of the DIP switch DSW-S, is transmitted from the card CAD to the microprocessor 32 as the code data, and the microprocessor compares this with the base code. If it corresponds thereto, it goes to step 145. The microprocessor 32 updates the content of the code register to one in which the content of the number register i is added to the base code and the change information (content of number register i) is sent to the card CAD. The change information is received and stored at the card CAD.

The control operation of the microprocessor TM of the card CAD in FIG. 9c will be described hereinafter. When the electric source becomes ON, i.e., the battery is set on in the card CAD, the microprocessor performs the initialization routine (step 162). At this initialization, the microprocessor TM clears the inside register, sets switches 25t and 25p ON and switch 25r OFF, and reads the state of the inlet port connected to switches $22_1$ to $22_3$ and $23_1$ to $23_3$. During any open state of all of these switches the microprocessor TM is waiting until any of switches becomes closed (steps 163), 173).

When one of switches $22_1$ to $23_3$ or $23_1$ to $23_3$ is closed, the microprocessor TM checks the content of the code register (inside register). If the content is 0, the base code (open and close data of DSW-S) is stored in the code register (step 165). When the content of the code register is not 0 (step 164) or the base code is stored in the code register in step 165, the content of register number i (register which stores the change information received from the microprocessor 32) is added to the content of the code register and the result is stored in the code register to update the code data with the last-received change information. The code as modified by the states of the switches $22_1$ to $23_3$, $23_1$ to $23_3$ is stored in the forward register (166). The content of the forward register is then transmitted (step 167). The sending switches 15p, 25t are set ON and the code word is sent by appending a predetermined number of L bits to the code word. The transmission is repeated several times.

The microprocessor TM turns the switch 25t OFF and the switch 25r ON and waits for a transmission from the microprocessor 32. During the ON state of any one of switches $22_1$ to $22_3$, $23_1$ to $23_3$, this wait state for a transmission is continued (steps 173-168-169-170-173). If a code resending requirement is received during the wait period (step 168), control returns to step 167 and again the code word preceded by the predetermined number of L bits is sent (step 167), and the wait state is resumed (steps 173-168-169-170-173). When the base code sending command is received (step 169), the base code is restored in the code register and a code word combining the states of the switches $22_1$ to $22_3$ and $23_1$ to $23_3$ and the content of the code register is restored in the sending register (step 172). Control returns to step 167. When the change information is received (step 170), the microprocessor TM stores change information in the register number i which is the inside register (step 171). When all of the switches $22_1$ to $22_3$, $23_1$ to $23_3$ come back to open (steps 173, 163), the switch 25p is set to OFF.

Figure 9C:
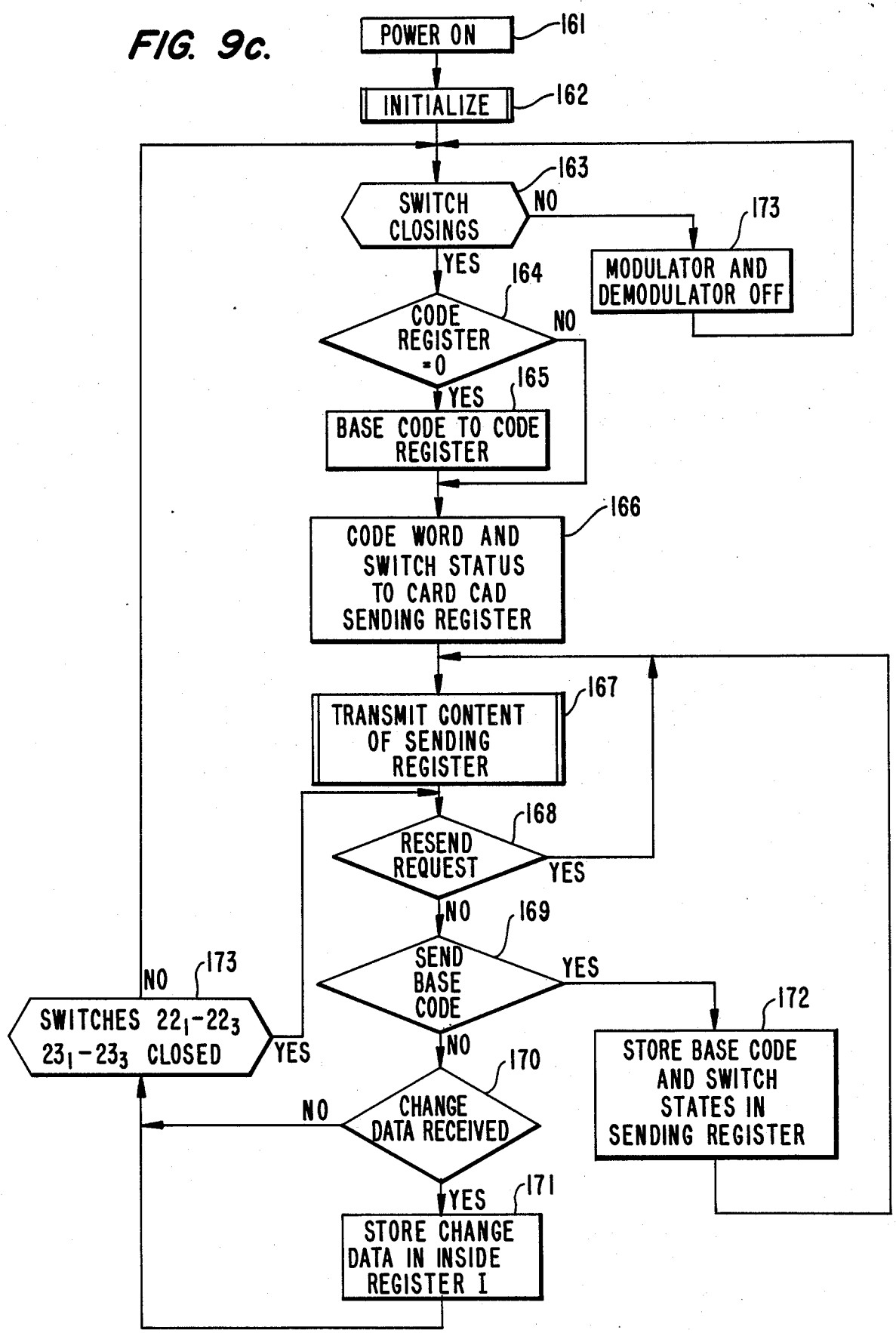
FIG. 9c is a flow chart showing the control operation of a microprocessor TM of the card CAD of FIG. 8b.
Figure 9D:
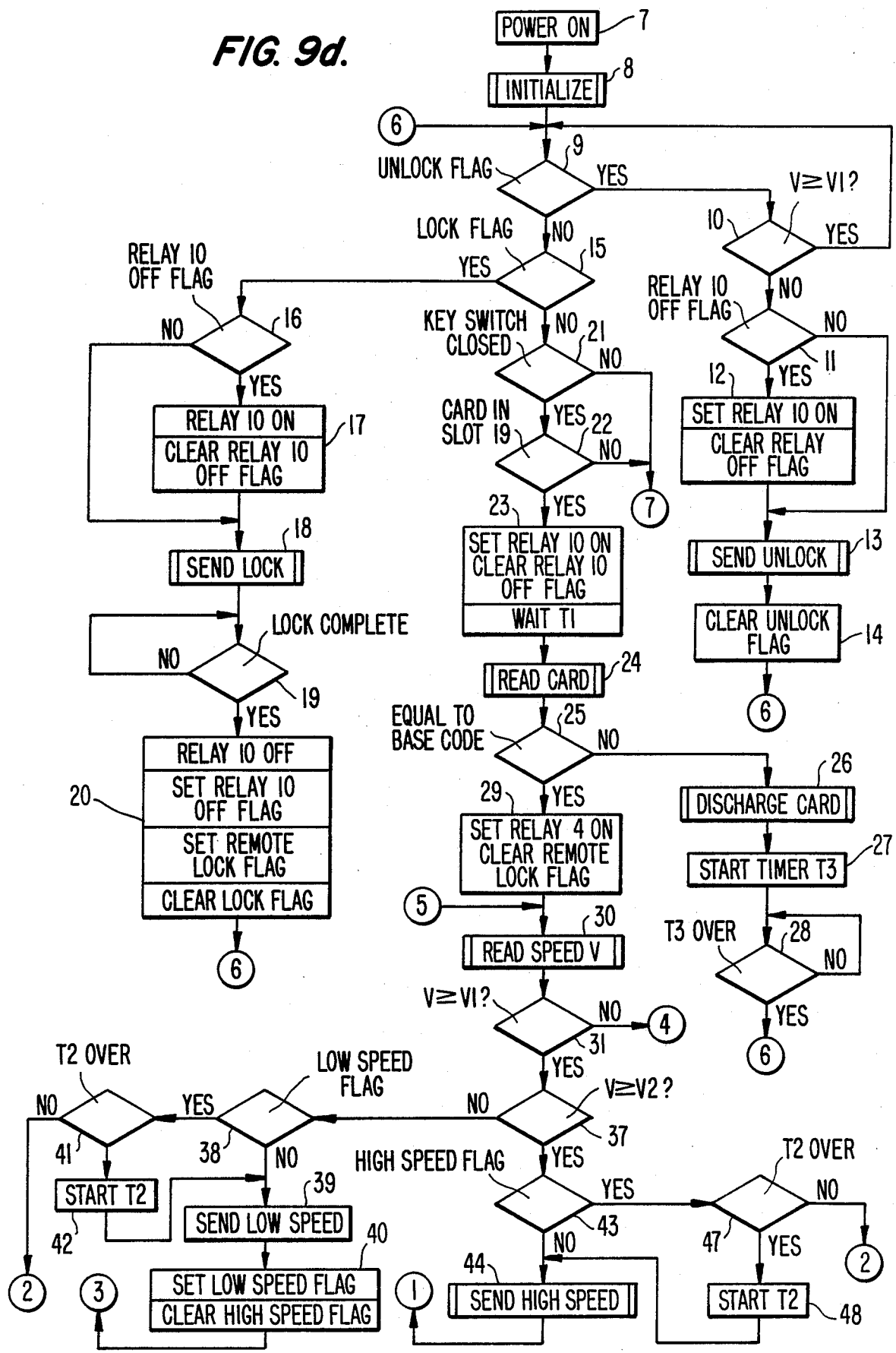
FIGS. 9d and 9e are flow charts showing additional control operations of the microprocessor 32 of FIG. 7.
Figure 9E:
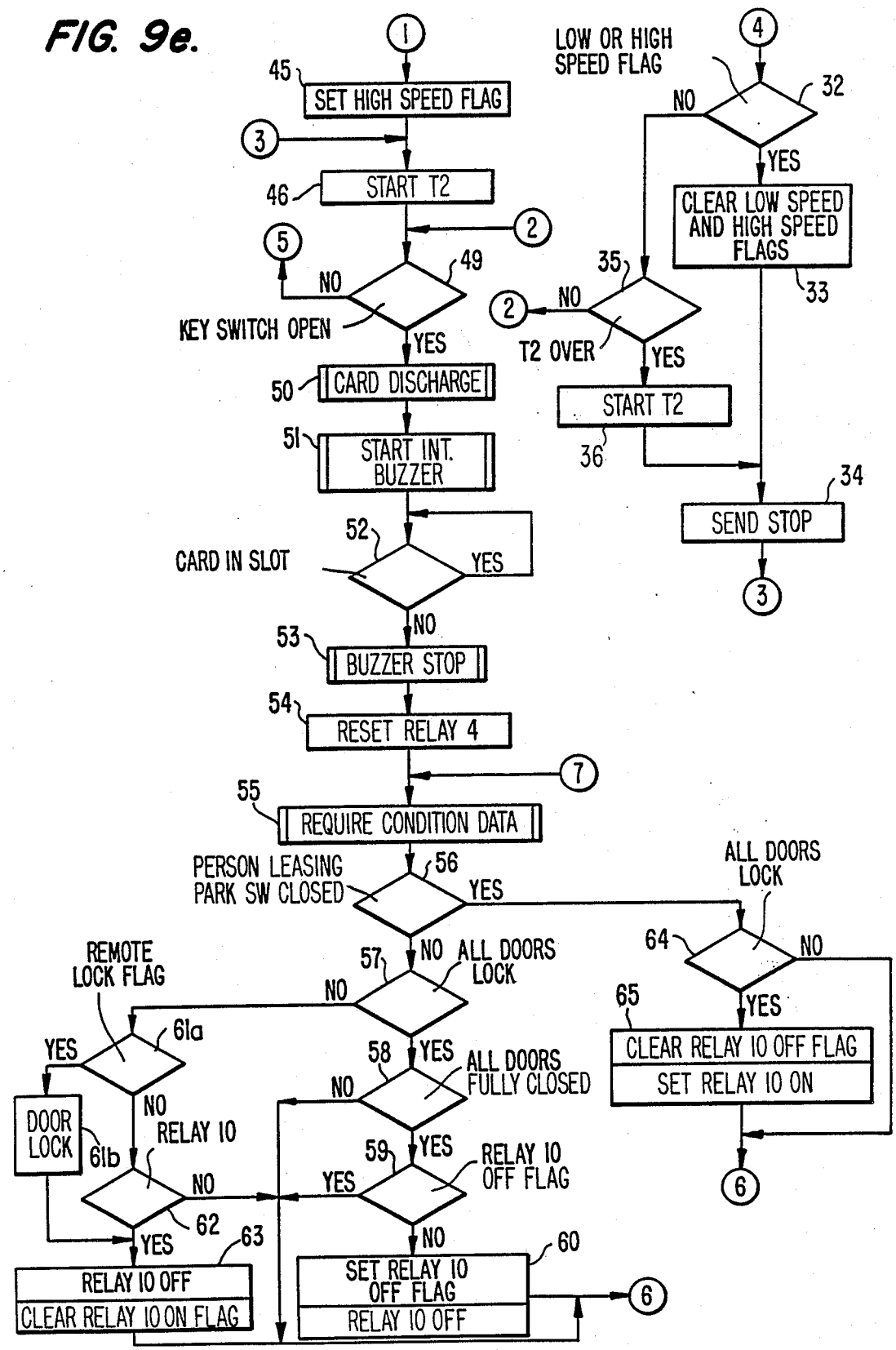

The above-explained interruption control sequence describes the processing of commands transmitted from the card CAD to the microprocessor 32 (FIGS. 9a and 9b) and instructions transmitted to the microprocessor TM from the microprocessor 32 (FIG. 9c). The sending code data is changed by the operation of one or more of the switches $22_1$ to $22_3$, $23_1$ to $23_3$.

When data transmitted from the card CAD from outside of the vehicle as modified with the change information from the card CAD are not identical with the code data maintained in the microprocessor 32, the microprocessor 32 requires the forwarding of the base code to the card CAD. The microprocessor 32 itself, however, does not forward the base code, so that the base code cannot be stolen, even if the signal is forwarded by a false sender sending the stolen code data. The base data is forwarded only under limited conditions, so that the probability of stealing the base data is extremely low.

FIGS. 9d and 9e show the main control sequence of the microprocessor 32 which is somewhat different from the first embodiment previously described. When there is the unlock flag set by the transmission of an unlock request from the card CAD, the vehicle speed V is checked to see if it is above the low speed value V1.

When the vehicle speed V is under V1 or the vehicle speed V becomes V1, the states of the switches $22_1$ to $22_3$ as transmitted in the received code word are tested. When the switch $22_2$ is closed, data ordering an "unlock" is sent to the microprocessor 34 of the door D1. If the switch $22_1$ is closed, data ordering an "unlock" is sent to each microprocessor of doors D1 to D4. If the switch $22_3$ is closed, data for ordering an "unlock" is sent to the microprocessor of the door LD (step 13). The door or doors subject to the "unlock" order will be unlocked.

The microprocessor 32 reads the open and close state of the person-leaving park switch 56. When the person-leaving park switch 56 is closed to indicate that a person is within the vehicle, all doors are in the locked state (steps 64, 65), and the inside handle switch 36i or the outside handle switch 36o is closed (upon door opening). The microprocessor 34 then begins unlock control. The electrical source is turned ON to the motor driver 35 and the motor M1 is driven in the reverse direction.

When all doors are in the lock state at step 64 and the lock knob switch 36 is not closed, there is no need for setting the relay 10 ON because both the inside handle switch 36i and the outside handle switch 36o are open.

If at least one of doors is fully open or half open just before, during, or afteer the driver exits the vehicle, control transfers to step 9 to wait for a fully closed door indication. At step 9, control transfers from step 21 to step 55 and the condition data of each door is obtained. When the door is opened by an unlock command (closing of the lock knob switch 36 and closing of inside handle switch 36i or outside handle switch 36o) the door automatically becomes locked when the last person exits the vehicle and all doors are closed. When the switch $23_1$ of the card CAD is operated from the outside of the vehicle, after the lock knob switch 36 of the doors D1-D4 is closed, the last person exits the vehicle and all doors are fully closed, the doors D1 to D4 and LD enter the lock state and the remote lock flag is set by the remote lock control.

When the engine key switch 2 is OFF, and the card CAD is pulled out from the slot 19, all doors are fully closed, the person-leaving park switch 31 is closed (person in the vehicle), the lock knob switch 36 of the door D1 to D4 is closed (unlock indication) and the inside handle switch 36i or the outside handle switch 36o is closed, the electric source for enabling unlock is set ON.

When the engine key switch 2 is OFF, the card CAD is pulled out from the slot 19, all doors are fully closed, the person-leaving park switch 31 is open (vacant vehicle), and there is a remote lock flag set by a lock command from the outside of the vehicle, the lock knob switch 36 is closed (unlock indication) and the relay 10 is maintained OFF. This occurs even if the inside handle switch 36i or the outside handle switch 36o becomes closed. The electric source of the motor driver 35 remains OFF and the doors will not be unlocked. The doors will be unlocked when an unlock command is transmitted by the card CAD from outside the vehicle.

When any of the switches $23_1$ to $23_3$ of the card CAD is operated and the lock flag is set, the remote lock control sequence from step 15 through the sequence following step 16 will be initiated.

The microprocessor 32 tests for the relay 10 off flag. If there is that flag, the relay 10 is made ON and the relay 10 off flag is cleared (step 17). If there is no relay 10 off flag, control transfers to step 18 because the relay 10 is already ON.

The condition data of switches $23_1$ to $23_3$ is tested. If the switch $23_1$ is closed, the microprocessor sends the data indicating lock to each microprocessor of doors D1 to D4, and LD. When data indicating "abnormal" is not sent from the microprocessor 34 of the door within the predetermined time, the relay 10 is cleared to OFF, the relay 10 off flag is set, the remote lock flag is set, and the lock flag is cleared (step 20), because it is considered that the lock operation is finished.

When the condition data shows the closing of switch $23_2$, a side window full-close order is supplied to the doors D1 to D4. An electric power mechanism for driving the side window is energized in doors D1 to D4, and a motor driver and a sensor thereof are connected with the microprocessor 34.

When the condition data show the closing of switch $23_3$, the "lock" indication data is sent to just lock door LD. The remote lock flag is not set upon the closing of switch $23_2$ or $23_3$, if the above sending is finished.

Referring to the lock and unlock control actuation, the microprocessor of the door LD is similar to the microprocessors of other doors. However, the microprocessor of the door LD does not process control operation to close the lock switch (36) (unlock indication), the inside handle switch 36i, and outside handle switch 36o.

The microprocessor 34 tests for the buzzer intermittent energization flag and the control sequence beginning with step 111 is performed during the intermittent energization of the buzzer 40 and also during the stopping of the buzzer 40. That is to say, the signal levels of the inlet ports P8 and P2 is tested, and when they are L (open of lock knob switch 36 and close of inside handle switch 36i or outside handle switch 36o to indicate lock), lock control operations under step 112 are performed. When they are H (unlock indication), the unlock control operation under step 123 are performed.

In this embodiment, when the signal level of the inlet ports P8 or P2 is L in the unlock control sequence, i.e., close of lock knob switch 36 and close of inside handle switch 36i or outside handle switch 36o, the high speed flag is tested (step 123) and processing is the same as in the first embodiment.

In the lock control sequence, however, when the lock switch 36 is open (lock indication) or closed (unlock indication), the lock control sequence under step 112 is performed upon high speed running.

In this embodiment the lock and release operation are performed in accordance with the lock and unlock indication from the microprocessor 32 and the states of the lock knob switch 36, inside handle switch 36i, outside handle switch 36o etc. at the appropriate microprocessors associated with the doors D1 to D4. Only an open and close indication switch corresponding to the outside handle switch 36o is mounted on the luggage door LD and the microprocessor of the control unit will commence operations to unlock the luggage door only when the unlock indication is supplied from the microprocessor 32, the luggage door is locked, and the outside handle switch is close.

Doors D1 to D4 are provided with a window driving electric mechanism and a window open and close switch. The motor driver for energizing the window drive motor and the window open and close switch are connected to the microprocessor of the appropriate door. These are not shown in figures. The microprocessor of the door performs the window driving control according to the window close indication from the microprocessor 32 and the state of the window open and close switch. Therefore, the output $V_c$ of the constant voltage circuit 11 is supplied to the motor driver to energize the window driving motor, and the microprocessor of the door closes the window fully upon receiving a command to fully close the window. When the lock operation is ordered upon the opening of the person leaving park switch (vacant vehicle) by using the card CAD, the window may not be opened, even if the microprocessor of the door orders the window open actuation because the electric source of the motor driver of the window driving motor is OFF.

Since the code data is changed when transmitting a code for door lock release by the card CAD in this embodiment, the effect for preventing a third party from entering the vehicle by stealing the code is high. The change of the code is automatically performed, without troubling the card owner. When the person-leaving park switch is open (vacant vehicle) and the locking system is in the remote lock state (locked state by using the card CAD from the outside of the vehicle), the door cannot be unlocked if the lock knob switch is unlocked (closed) and the inside handle switch 36i or the outside handle switch 36o is closed. This further ensures the security of the locking system. Further, when the code of the card CAD does not correspond to the code stored in the microprocessor 32, the engine ignition circuit IGC may not actuated.

In the first embodiment according to the present invention, the door lock apparatus (FIG. 4) cooperates with the inside handle and the outside handle of the door, and the lock lever 45 is driven to release the lock. This means that the pawl is mechanically driven. In the second embodiment of the present invention, the mechanical structure is omitted from the description, namely, an inside open indication switch is closed by operating the inside handle and an outside open indication switch is closed by operating the outside handle. These switches are connected to the microprocessor of the door. The lock lever 45 is directly rotatably driven by the nut bar 46 (release operation). The switch for the lock knob switch is provided. When the lock knob switch is open (lock indication) or the lock indication is received from the microprocessor 32, the microprocessor of the associated door drives the nut bar 46 to the lock position. When the lock knob switch is closed (unlock indication) and the inside handle switch 36i or the outside handle switch 36o is closed, the microprocessor of the door drives the nut bar 46 to the unlock position and maintains it at that position. When the inside handle switch 36i or the outside handle switch 36o returns to the open state, the microprocessor of the door returns the nut bar 46 to the lock position.

The microprocessor of the door is actuated in accordance with the microprocessor 32 and the indication of the switch of the door portion in the aforementioned embodiment. However, it can be constructed that the lock continuation indication is sent to the microprocessor 34 of the door D1 by the microprocessor 32, and the microprocessor 34 of the door D1 will thereafter not respond to any switch in the door. Thus, the lock is continued until a lock continuation release order is received from the microprocessor 32.

Further in the second embodiment, the data is exchanged by utilizing the microprocessor 32 and the microprocessor of each door. It may be also constructed that the control of the microprocessor 32 and the microprocessor of each door is performed by one computer system including one microprocessor or a plurality of microprocessors.

According to the above-mentioned embodiment the code for the lock release is automatically changed, so that the code cannot be stolen, the security becomes high, and the effect of the prevention of crimes also becomes high.

By the foregoing, there has been disclosed two preferred embodiments of a lock control device for vehicles constructed in accordance with the present invention. It will be appreciated that various additions, substitutions, modifications and omissions may be made thereto without departing from the spirit of the invention.

What is claimed is:

1. A lock device for a vehicle comprising:
   lock instruction means for selectively generating and transmitting a command to lock or unlock the lock device, said lock instruction means including register means for storing a base code and an update code, each of said base code and said update code identifying said lock instruction means, said lock instruction means for transmitting said command including a transmitter identification portion corresponding to said update code;
   lock control means for storing a reference code and for establishing a locked state for the lock device in response to said reference code being equal to said transmitted transmitter identification portion and said command being to lock the lock device and an unlock state in response to said reference code being equal to said transmitted transmitter identification portion and said command being to unlock the lock device;
   code changing transmission means responsive to said reference code being equal to said transmitted transmitter identification portion for transmitting to said lock instruction means information for modifying the transmitter identification portion and for modifying said reference code in accordance with said modifying information; and
   code update means in said lock instruction means, responsive to said modifying information, for storing a modified transmitter identification portion as said update code in said update code register.

2. A lock device for a vehicle according to claim 1, further including:
  transmission error indication means in said lock control means for transmitting a retransmit signal each time said transmitted transmitter identification portion is not equal to said reference code; and
  base code transmission means in said lock instruction means for transmitting said base code in response to receipt of a predetermined number of said retransmit signals, said lock control means for receiving said base code and for establishing a lock state if said base code is equal to a base reference code and said transmitted command is to lock the lock device and for establishing said unlock state if said base code is equal to said base reference code and said transmitted command is to unlock said lock device.

3. A lock control device according to claim 1, further including an electric lock device adapted to lock or unlock a door of the vehicle.

4. A lock control device according to claim 3, wherein said lock control means includes means for supplying an unlock indication to said lock setting apparatus in response to the establishment of said lock state and wherein said lock setting apparatus includes a lock driver for energizing said lock device to unlock said lock device in response to said unlock indication.

5. A lock control device according to claim 4, wherein said lock driver further includes means for controlling said ignition circuit lock control to unlock said ignition circuit lock in response to the establishment of said unlock state.

6. A lock control device according to claim 5, wherein said lock instruction means includes a microprocessor for generating said lock command or said unlock command, a transmitter for transmitting said lock command or said unlock command, and a receiver for receiving said change data.

7. A lock control device according to claim 5, wherein said lock device further includes an ignition circuit lock and an ignition circuit lock control, and wherein said unlock command includes a lock device unlock code and an ignition circuit unlock code, said lock control means for establishing said unlock state if said lock device unlock code is equal to an unlock device reference code and if said ignition circuit unlock code is equal to an ignition circuit unlock reference code.

8. A lock control device according to claim 7, wherein said code change generating means further include means for correspondingly changing the value of said unlock command and said unlock reference code with reference to said change data in response to said preceding value of said unlock command being equal to said preceding value of said unlock reference code.

9. A lock control device according to claim 8, wherein said lock control means includes a microprocessor, a receiver for receiving said transmitted lock command or unlock command, and a transmitter for transmitting said change data to said lock instruction means.

* * * * *